Figure 5:
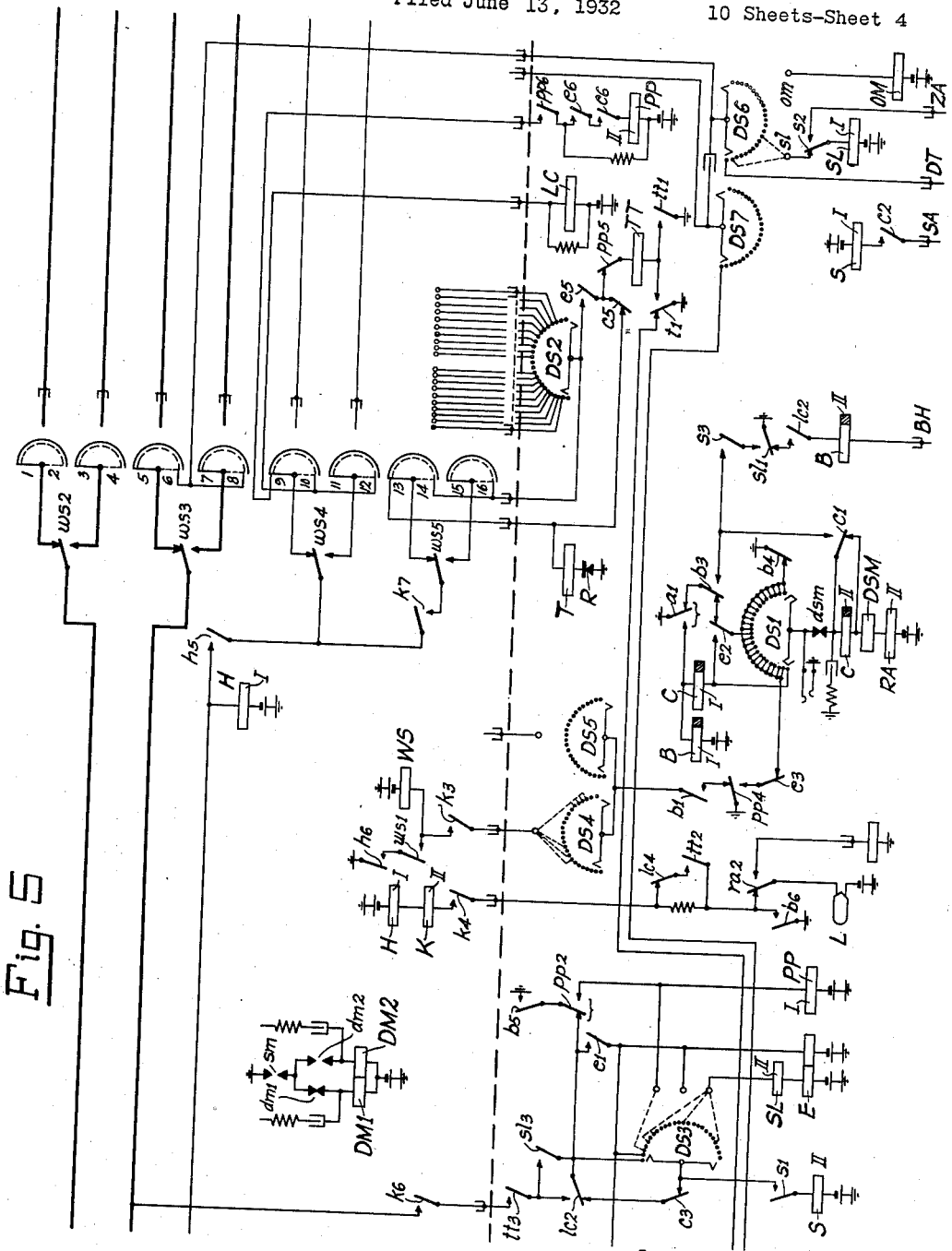

Aug. 28, 1934.　　W. G. PATTERSON ET AL　　1,971,501
TELEPHONE SYSTEM
Filed June 13, 1932　　10 Sheets-Sheet 1
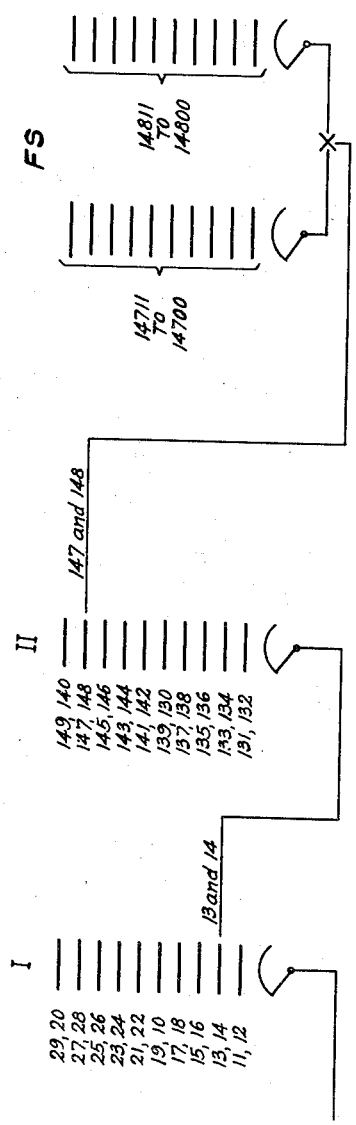
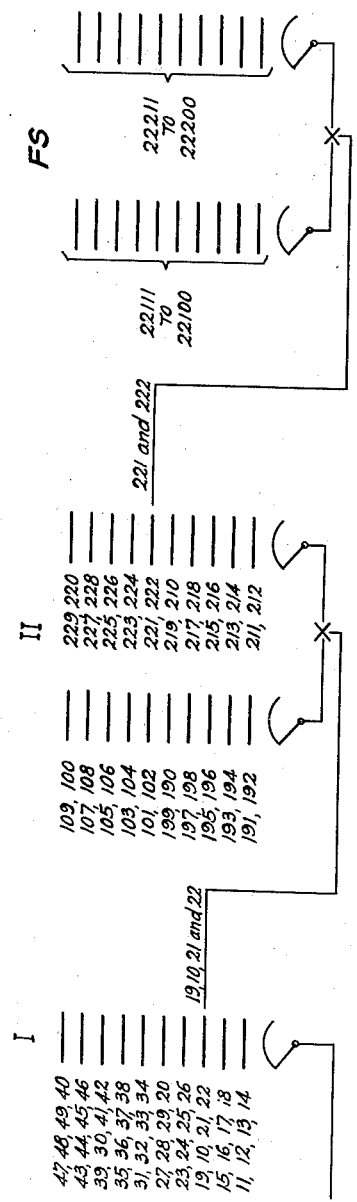
Inventors
William George Patterson
David Adam Christian
William Herbert Grinsted

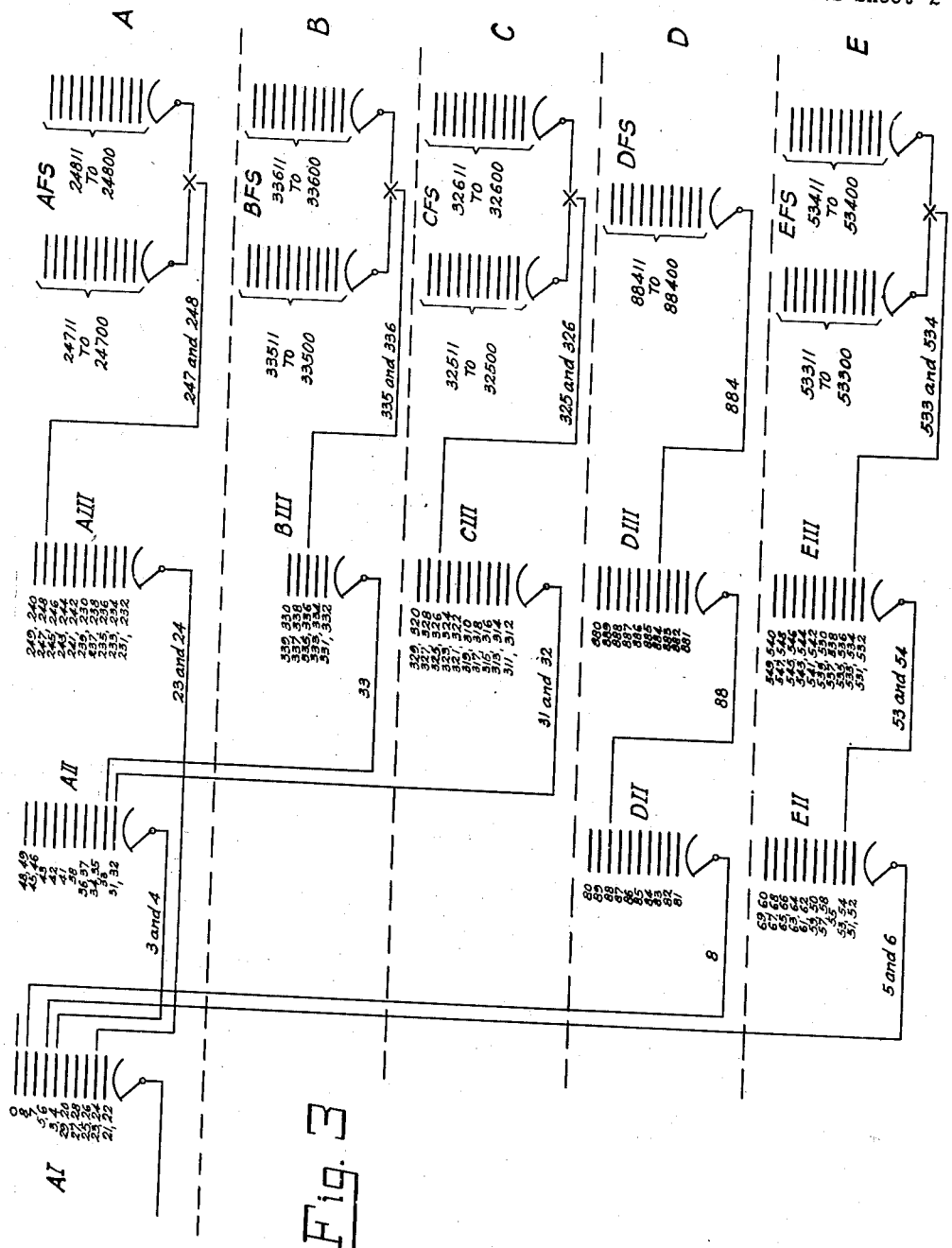

Aug. 28, 1934.   W. G. PATTERSON ET AL   1,971,501
TELEPHONE SYSTEM
Filed June 13, 1932   10 Sheets-Sheet 3

Fig. 4

Inventors
William George Patterson
David Adam Christian
William Herbert Grinsted
R G Richardson
Atty.

Patented Aug. 28, 1934

1,971,501

UNITED STATES PATENT OFFICE 1,971,501

TELEPHONE SYSTEM

William George Patterson, David Adam Christian, London, and William Herbert Grinsted, Bromley, England, assignors to Siemens Brothers & Company Limited, London, England Application June 13, 1932, Serial No. 617,018
In Great Britain June 13, 1931

13 Claims. (Cl. 179—18)

This invention relates to automatic and semi-automatic telephone systems and other systems in which automatic route selection is involved. It has in view amongst other things improved trunking arrangements and improved utilization of switches or selectors.

In automatic telephone systems working on the decimal basis a switch is steered to a particular group of outlets by the dialled digit depending on which digit is dialled, that is, there are ten choices as regards outlet groups. In final selectors a second digit exercises a choice in the outlets of the particular group. As far as group selectors are concerned the digit dialled determines a route to the succeeding rank of switches and as far as a switch is concerned the route into it is significant of a particular digit having been received at a preceding switch.

A switch however may exercise selection amongst a greater number of outlet groups than the number forming the basis of the numbering scheme, that is, it may exercise selection amongst more than ten groups in the decimal system of working. This is actually the case where a system is provided as known with two hundred point final selectors but it must be noted that the switch exercising the greater selection as above must have some indication conveyed to it to cause a further selection apart from the impulses it receives.

The indication may be in the form of an incoming signal or may arise from the fact that there are several entries to the switch each having a significance of its own relatively to incoming traffic.

It will be clear that if one switch has a greater selective power than that corresponding to the number of different digits it can receive a preceding switch can have a lesser selective power, that is to say, an outlet group at some preceding switch is common to more than one dialled digit and vice versa as regards the increased and lessened selection.

In the system of the present invention a selector other than a final selector receives two indications indicative of the destination of the call and both indications are utilized to steer the selector to a group of outlets and furthermore a signal dependent on one of the indications is transmitted to a subsequent switch for partly controlling the setting thereof.

According to another feature of the invention a group of outlets from a selecting switch of any one rank to switches of a succeeding rank carries traffic represented by more than one digit of the same digit place and a differentiating signal is transmitted to cause a corresponding separation or segregation at the subsequent rank, the signal being utilized at the selector receiving the same to direct the call to one of a plurality of sets of outlets groups or main routes as they might be termed, the selection of a particular outlet group within a set or main route being effected consequent on receipt of a numerical indication e. g. a train of impulses. Dependent on the particular significance of the numerical indication e. g. whether a digit is odd or even, a route indicating condition is set up for transmission to the succeeding stage. This indication takes the form of a signal and may be transmitted over the speaking wires.

For the segregation of traffic the sets of outlet groups from a selector may be connected in different subdivisions of its bank and the route indication cause a selector to select in accordance with the numerical indication in a particular sub-division of the bank.

By successive segregation at the several switching stages the numbering of the subscriber's lines at the final selectors will be in consecutive hundreds and the particular advantage is obtained that in a multi-office area the whole of the lines at any exchange are consecutively numbered.

At the first selector no discriminating signal is received but the control parts of or associated with the switch may exercise a preliminary selective action if desired, e. g. in response to a preliminary digit.

The route indicating signal may be passed over junctions and may be received at and repeated by a repeater.

By the employment of single motion switches great flexibility may be readily obtained as regards the number of outlets in a group and the number of groups and their disposition in the switch banks.

A group indicating signal of preliminary impulse train received at a switch may cause a starting position to be marked and cause the immediate advancement, if necessary, of the switch to such a position.

The control of a number of selecting switches whatever type is employed may be effected from a common control circuit from which a marking of the selecting switch bank is effected.

In a single motion rotary selector with staggered wipers at which the reception of an impulse train results in the marking of one or more groups of outlets the wipers may be moved to defined positions in response to the route indication so that the first marked group encountered will be the proper one in which search is to be made. Alternatively the route indicating signal may bring about selection of one or other of a plurality of wiper sets.

The invention also includes novel arrangements for a first selector which is arranged to respond to one or two trains of impulses. Selection of some groups of contacts may be according to one or more digits of a single impulse train and of other groups of contacts in accordance with two impulse trains and as regards the second impulse train different digits may steer the selector to the same group of outlets. The selector has here the dual function of a first and second selector and a rank of selectors is accordingly saved, and a portion of the bank is available for junction working. In the case of selection in response to two impulse trains the first digit may determine the particular sub-division of the bank in which search is to be made in response to the second digit and the value of the single or second digit may determine the nature of the route indication to be transmitted.

The method of traffic segregation according to the invention is applicable to cases in which a selector is directed to the same group of contacts if any one of a greater number than two dialled digits is received at the selector, e. g. four digits. In this case each level corresponds to four different digits and a four way route indication is necessary to segregate the traffic at the succeeding switch. Marginally operated relays may be used for this purpose and may have the effect of selecting and the marking of a starting position from which search is to be made.

It is to be understood that the size of the switch or the grouping of the outlets need not be the same in the several selecting stages but can be varied as desired since for example in one rank the same level in a switch may be reached using any one of four different digits and in another rank by the use of either of two digits.

For the better understanding of the invention reference will now be had to the accompanying drawings which show diagrammatically in Figs. 1, 2 and 3 examples of automatic telephone systems involving route selection according to the invention and in Figs. 4-11 circuit diagrams for the selecting switches and other apparatus suitable for use in the improved route selecting arrangements.

Fig. 1 shows in diagrammatic form three ranks of switches for setting up a call in a 20,000 line system in which the subscribers' numbers lie between 10,000 and 29,999. The switches are shown in the manner commonly employed for two motion switches and of the so called "Strowger" type in which the wipers are first moved vertically in response to an impulse train and then rotate over the level of contacts selected in the vertical movement to search for a free outlet in the level or are rotated to a particular outlet in the level in response to a further impulse train. Although the switches in this figure and in Figs. 2 and 3 are shown in this manner it is to be understood that the switches may be of the single motion rotary type in which the levels of outlets are arranged as groups of contacts in a single bank or plurality of banks engaged either singly or in pairs by the switch wipers. Switches of the rotary type are shown in the circuit diagrams forming Figs. 4, 5, 7, 9, 10, 11.

Continuing with the reference to Figure 1 it will be seen that the first selector I and the second selector II has each ten levels of contacts and the final selector FS has 20 levels of contacts. The first selector receives two impulse trains which jointly direct the wipers to a particular level over which a route is selected for reaching a subscriber in one of a pair of "thousands" groups in one or other of two "ten thousands" groups. Thus the second level provides a route for subscribers connected in the 13 or 14 "thousands" group and a second selector taken into use over this level is common to both groups.

As shown in the figure the first digit 1 received at the first selector is absorbed, that is to say, it does not effect any switch movement, but it determines that the particular level to be selected is one of the lower five levels. If the first digit is 2 the selector wipers are stepped to a sub-normal position, which in the present example may be opposite the fifth level, from which it is stepped by the second digit to select one of the upper five levels.

A route in a pair of thousand groups having been selected a second selector is taken into use and is set by the third dialled digit in the usual manner to select a level in accordance with the digit dialled. Differentiation at the selector is however required to distinguish between the two "thousands" groups to which it has access and this is effected by causing the switch to select in one of the lower five levels or one of the upper five levels according to the thousands group required. This discrimination takes place consequent on the receipt of a signal from the first selector, the receipt or non-receipt of the signal causing the switch to respond to impulses by stepping from its normal position or to make a preliminary movement to a sub-normal position from which it is stepped by impulses to select one of the higher levels. The signal is transmitted or not from the first selector according as the second digit received thereat is odd or even. As shown, if the second digit is 3 the second selector steps on receipt of impulses to select one of the first five levels, while if the second digit is 4 the second selector is stepped on seizure to a sub-normal position, e. g. opposite level 5 from which it is stepped by the third impulse train to select one of the upper five levels.

A level in the second selector is reached in response to either of two third digits, and provides a route to lines in two "hundreds" groups. Thus the ninth level gives access to lines in the 147 and 148 "hundreds" groups. The second selector seizes a free final selector in the desired "two hundreds" group and a signal is transmitted forward to the final selector for discrimination between the two hundreds of the pair. This signal causes a connection over one or other of two wiper sets to be effective and the final selector is set by two trains of impulses in the normal manner to select a pair of lines, one in each "hundreds" group, the particular line of the pair to be connected with being determined by the connection to the wipers made in accordance with the signal received from the second selector.

It will thus be seen that the first selector over ten groups of outlets selects one of two main routes, (one in each "ten thousands" group) in response to the first digit, the group of outlets within the selected main route being selected in accordance with the second digit and being common to two different "thousands" in the "ten thousands" group. It transmits a signal to the second selector to cause it to select one of two main routes, (one in each "thousands" group) and the second selector in response to impulses selects a route common to a pair of "hundreds" groups. The second selector transmits a signal to the final selector to cause it to select in one of the two "hundreds" groups.

Since discrimination between pairs of consecutive digits received at a selector is effected by the transmission of a signal to the next succeeding switch it will be appreciated that the two main groups at each selector will bear consecutive numbers and at the final selector the numbers in the banks accessible to the two wipers will be in consecutive "hundreds" groups in the same "thousands" group.

Further developments of this routing arrangement are shown in Fig. 3.

Fig. 2 shows a similar arrangement of three ranks of switches for a 40,000 line exchange. In this arrangement the first selector I responds to two trains of impulses as before, the first digit being one of the numbers 1, 2, 3, 4 to select one of four main routes, a main route leading to subscribers in one of the 10, 20, 30 or 40 "thousands" groups. A group in one of the main routes is selected in accordance with any one of four consecutive digits and this involves a 4 way discrimination at the second selector whereby the call may extend over one of four main routes. The second selector has 20 levels of outlets, ten levels being accessible over one wiper set and ten over another. Outlets over each wiper set are divided into two main routes corresponding to the two consecutive digits of a pair giving access to the switch over a level in the first selector. There are thus four main groups outgoing from the second selector. A choice is effected between these groups by means of a signal from the first selector, the signal determining which of the two wiper sets is to be used and whether stepping is to commence from the normal or subnormal position. Each level in the second selector is reached in response to either of two digits of a pair for the selection of a final selector serving two hundred lines and a signal is transmitted to the final selector to cause it to select in one or other of the "hundreds" group of lines.

Fig. 3 shows a typical layout of an exchange area comprising fives exchanges A–E as regards calls originating at exchange A. Calls originating at other exchanges will be dealt with in a manner suitable to the exchange concerned.

Considering the exchanges one by one it may be assumed that A is an exchange of 10,000 lines numbered from 20,000 to 29,999. For a local call three ranks of switches are involved, local routes being outlets from the first five levels of the first selector AI. These levels are reached by dialling the first digit "2" followed by a second digit. Over each level are routed calls in two "thousands" groups, a level being reached by dialling either of a pair of second digits. Other levels of the first selector are allocated to junctions and to manual board calls and some levels may be spare. Outlets from the first five levels give access to local group selectors AIII which respond to the third digit dialled and receive a signal from the first selector, a local group selector routing the call over one of two main routes according to whether the second digit is odd or even. Each level gives access to "two hundred" point final selectors which receive a signal from the local group selector to determine in which "hundreds" group selection is to be made. The route taken by a local call to a subscriber in the 247 and 248 "hundreds" groups is shown. The first digit 2 has no selective function, the second digit 4 causes the first selector to step to the second level over which it hunts for a free local group selector AIII, to which it transmits a signal causing it to step to a subnormal position. The selector AIII receives 7 or 8 impulses and is stepped to level 9, counting from the normal position, and searches in that level for a free final selector AFS to which it transmits a signal for connecting up one or other set of wipers. The fourth and fifth digits set the final selector in the usual manner.

B may be assumed to be an exchange to which 1000 lines numbered from 33000 to 33999 are connected. A call from A to B is routed over the sixth level of the first selector AI and the second level of selector AII in exchange A and over a 5-level incoming selector BIII and final selector BFS in exchange B.

For a call from A to B a first digit 3 steps the first selector AI to the 6th level over which it searches for a free second selector AII and transmits a signal to it which has no effect since selection is to take place in one of the lower five levels and no preliminary stepping to a subnormal position is required. The second digit "3" steps the second selector AII to the second level over which it searches for a free junction to exchange B terminating in the selector BIII. No signal is transmitted as there is no choice of main routes at this selector, it having already been determined that the required number is in the 33 "thousands" group. The third digit, which may be 5 or 6 for the final selector shown, steps the selector BIII to the third level over which it searches for a free final selector to which it transmits a signal for the connecting up of one or other of a pair of wiper sets and the final selector responds to the fourth and fifth digits for the selection in conjunction with the received signal of the wanted line.

C may be assumed to be an exchange having 2,000 lines connected to it. Junctions from A to C are taken from level 1 of selector AII and in this case a level corresponds to two "thousands" groups since the incoming selector CIII is of the 10 level type followed by a 200 point final selector. A signal is transmitted from AII to CIII to cause it to step to a sub-normal if the second digit is "2" as the selector CIII has a choice of two main routes depending on the value of the second digit. The incoming selector selects a level in response to either of two consecutive digits of a pair and transmits a signal to the final selector to select the required "hundreds" group.

D may be assumed to be a 10,000 line exchange having for incoming junction calls, an incoming selector DII, a local group selector DIII and a 100 point final selector DFS. Calls to this exchange are routed over the ninth level of AI reached by dialling the single digit "8", the "thousands" and "hundreds" digits being received by the selectors DII and DIII respectively each of which makes a simple selection in one of ten levels. The "tens" and "units" digits set the 100 point final selector in the usual manner.

Junctions to exchange E are taken from the 7th level of AI in response to the digit 5 or 6 and the exchange may be assumed to have up to 19,000 lines. The junctions terminate on incoming selectors EII of the type which select in two main groups in accordance with impulses and a signal received from the preceding selector. Selectors EIII and EFS are similar to AIII and AFS respectively. It may happen that one of the "thousands" groups is heavily loaded as for example by P.B.Xs or that exchange E has attached to it a sub-exchange of 1,000 lines. To cope with this it is only necessary to make the appropriate level in the incoming selector available to lines in a single "thousands" group instead of to lines in two "thousands" groups. Level 3, corresponding to the 55th "thousands" group is so shown and outlets from this level may be taken to selectors similar to DIII situated in exchange E or a sub-exchange connected to it.

Manual board calls may be set up by dialling the single digit "0" in the usual manner the first selector in this case behaving exactly like the first selector in the commonly used 10,000 line systems.

It will be noted that in the layout shown level 8 is unconnected and levels 1, 3, 4 and 5 have been assumed to be allocated to exchange A. Level 8 could be used for junctions to an exchange similar to D or it may be connected to second selectors for connection to an exchange like B. The upper five levels of the second selector AII may be connected to other exchanges similar to B and C, the arrangements admitting of great flexibility in routing. It will be appreciated that the flexibility of the arrangements will be increased by using selectors which search for a group marked in response to a digit or digits in conjunction with the differentiating signal as the size and position of the groups in the switch banks may be chosen to suit the requirements of each case.

Figure 6:
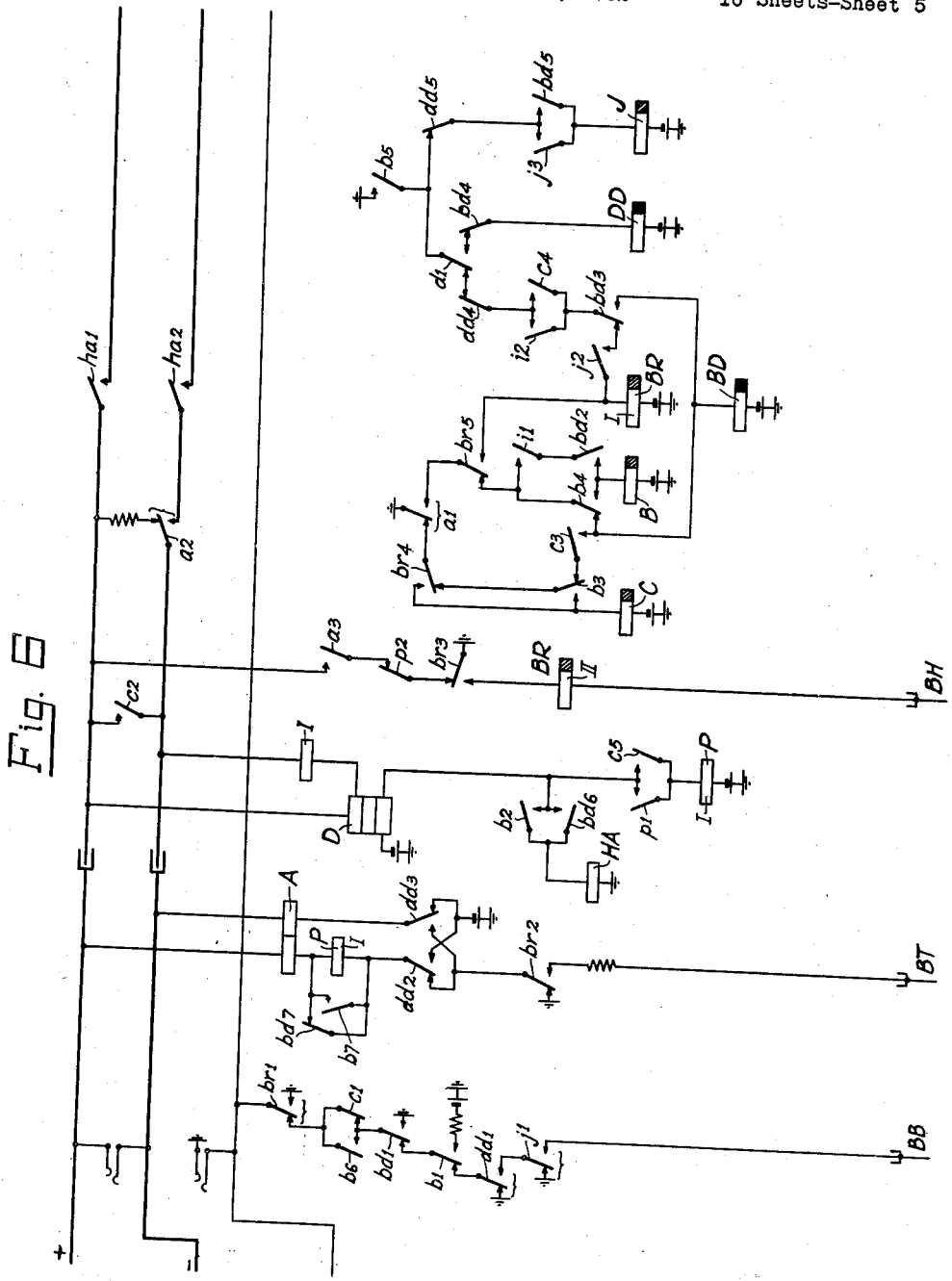
Figure 8:
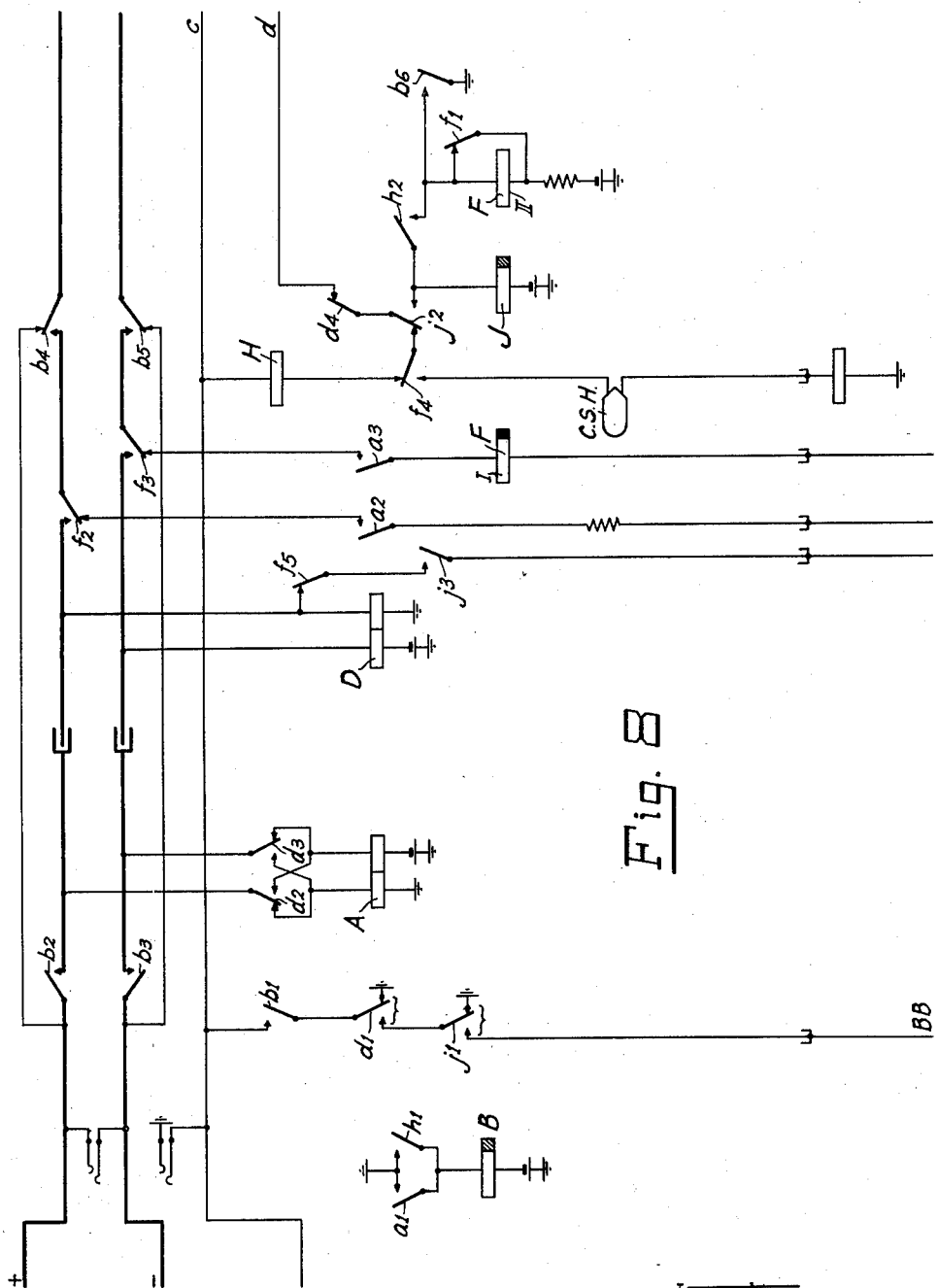
Figure 9:
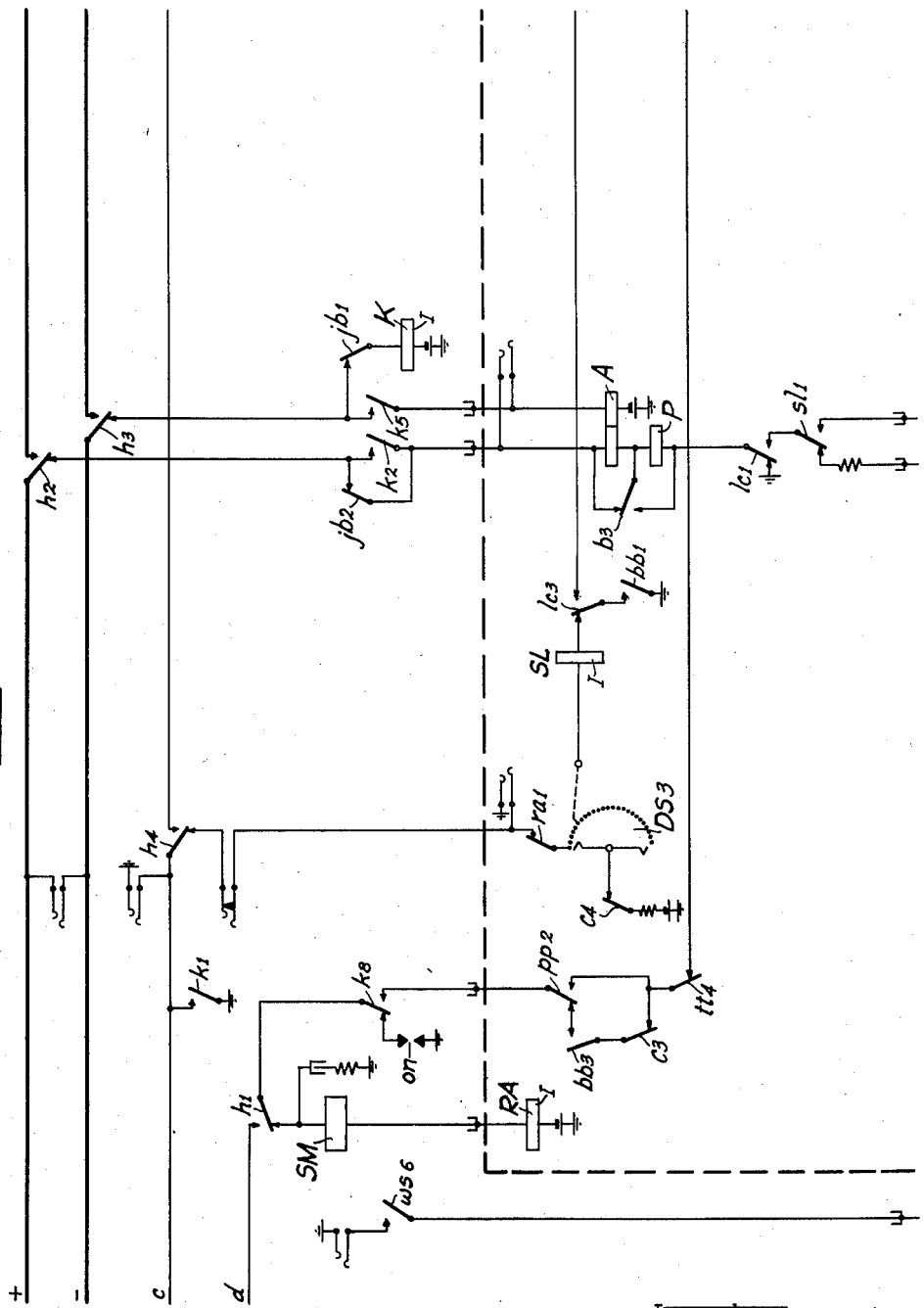
Figure 10:
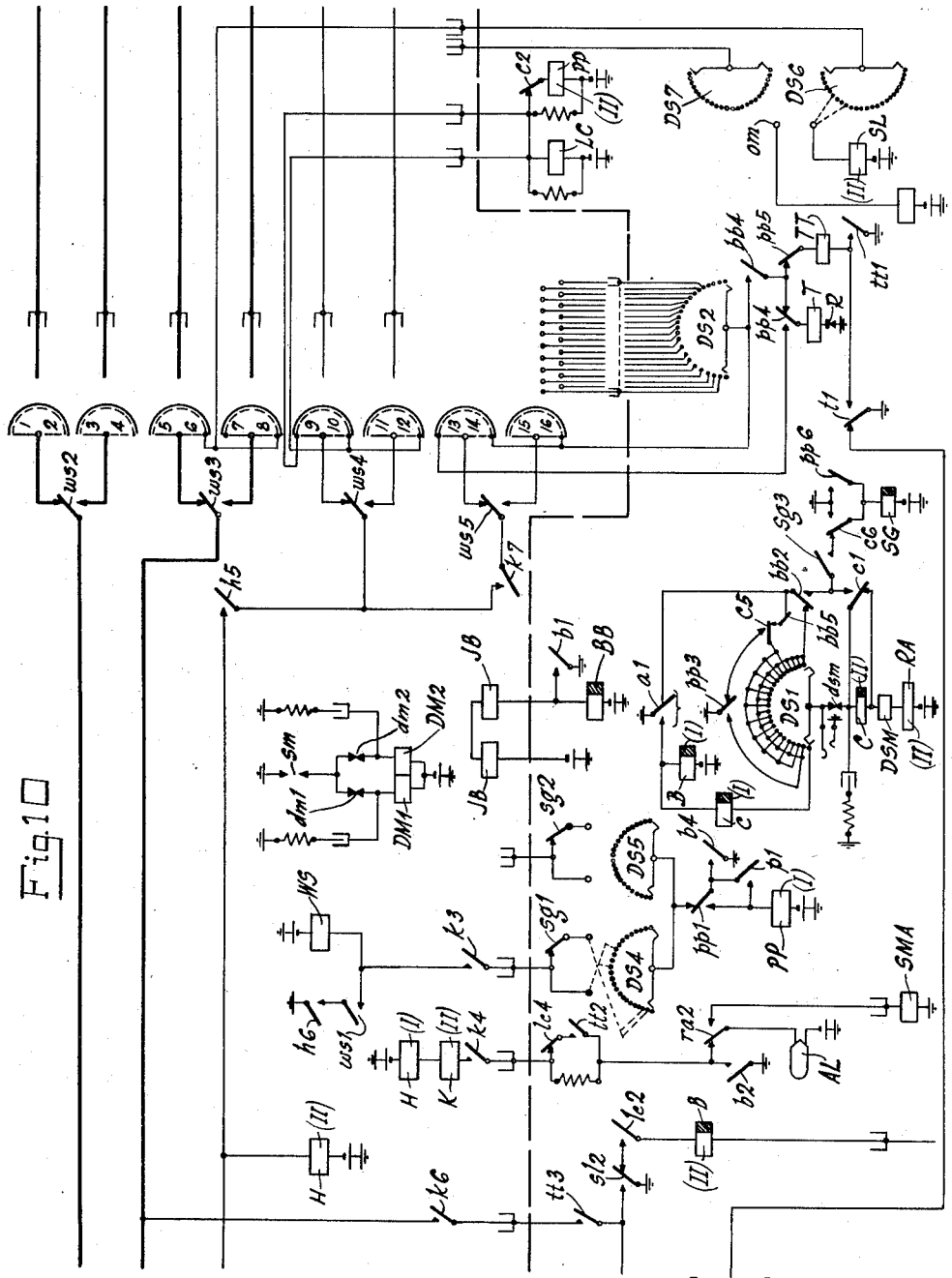
Figure 11:
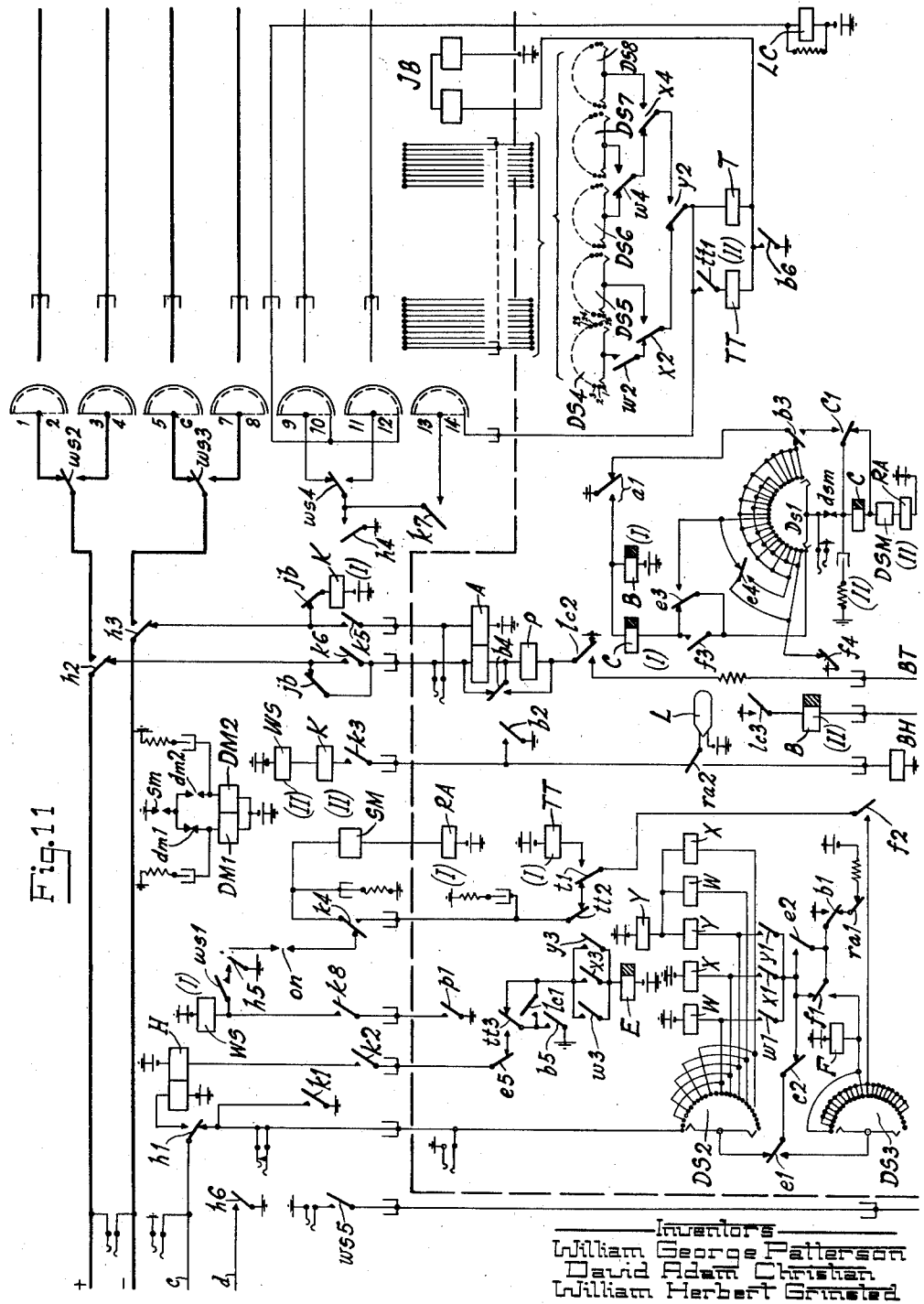

Arrangements for setting the first selector in response to one or two digits are shown in Figs. 4 and 5 while circuit arrangements for a group selector set by a digit and a differentiating signal are shown in Figs. 9 and 10 and a 200 point final selector in Fig. 11. An outgoing repeater is shown in Fig. 6, an incoming selector in Fig. 7 and a feeding bridge circuit in Fig. 8. The bridge circuit may be situated at any convenient place in a call route but for the purpose of description it will be assumed to be connected before the pre-final selector.

The selectors shown in the circuit diagrams are provided with 2 sets of wipers and give access to 200 outlets. The outlets are connected to contacts arranged in four sets of levels, a set of levels comprising speaking, test and marking wire levels. One pair of sets of levels is associated with one wiper set and the other pair of sets of levels is associated with the other wiper set, one or the other wiper set being connected up by a wiper switching relay. The two wiper sets move simultaneously over their associated levels. As regards any one wiper, the wiper is double ended, the two ends being arranged to rotate in different planes so that one end traverses one level after which the other end traverses the other level of the pair.

In the incoming and final selectors there are only two marking levels, these being traversed successively by different ends of the same wiper so that only one level is engaged at a time.

The first group and final selectors may each be associated with a common control circuit for the control of the selector operations. The first selector wipers may be rotated to a sub-normal position depending on the value of the first digit received by it, the sub-normal position being reached by rotating the wipers until the ends shown in full lines have traversed the associated levels, (denoted by full line semicircles) and the wiper ends denoted by dotted lines have been brought to the commencement of their associated levels (denoted by dotted semicircles). The wipers of the group selector may be rotated to a similar sub-normal position on receipt or non-receipt of a signal from the preceding selector. The receipt or non-receipt of a signal at the incoming and final selectors does not bring about a preliminary rotation of the switch wipers but operates a wiper switching relay for the selection of one or other set of wipers. For the sake of clarity and uniformity the signal will be taken as being the application of earth to one of the speaking wires (the negative wire at selecting switches) at the time of switching through and its effect will be to prevent the preliminary rotation of a seized switch or the operation of the wiper switching relay as the case may be.

The selectors are of the single motion rotary type and rotate at a high speed. A selector is rotated by a pair of electromagnets DM1 and DM2 acting on a rotatable armature, the armature spindle being suitably connected to the wiper shaft by means of gear wheels in order that a desirable speed of wiper rotation may be attained and that stopping positions of the armature may correspond to contact positions in the wiper banks. For controlling rotation of the switch a magnet SM is provided the armature of which operates a sprag having teeth in its edge for engaging the teeth of one of the gear wheels in the driving mechanism of the switch. When the sprag magnet is not energized the sprag engages a gear wheel of the driving mechanism and prevents rotation of the wiper shaft. When the magnet SM is energized the sprag is withdrawn and contact $sm$ is closed by the magnet armature thereby closing a circuit for one of the driving magnets DM1 or DM2. It may here be remarked that it is convenient for the driving magnets to be arranged with their pole faces 90° apart with respect to the circle of rotation of the armature, energization of a magnet effecting a 90° rotation of the armature, this rotation being the amount required to advance the switch wipers from one contact to the next. Associated with the armature is a cam device acting on contacts $dm1$ and $dm2$ for directing current to the two driving magnets alternately. In the drawings contacts $dm1$ are shown closed and $dm2$ open. When the sprag magnet is energized contact $sm$ closes and magnet DM1 energizes and the armature commences to rotate. The cam now comes into operation, opens contact $dm1$ and closes $dm2$ and this is timed so that magnet DM2 is energized when a pole of the armature has been sufficiently rotated so as to be attracted by magnet DM2, and the armature is rotated a further 90°. During this second quadrantal rotation the cam again comes into operation, and opens contact $dm2$ and closes contact $dm1$ so that another quadrantal rotation is commenced. The switch is stopped by de-energizing the sprag magnet which thereupon opens the driving magnet circuit at contact sm and brings the sprag into engagement with the gear wheel of the driving mechanism.

Consideration will now be given to the operation of the circuits shown in Figs. 4 and 5 which show a first selector of a type suitable for use as selector AI in Fig. 3. The selector has banks of contacts divided into four sets of levels. The levels of one set are associated with wiper arms 1, 5, 9, 13 and the levels of another set are associated with wiper arms 2, 6, 10, 14 these wiper arms being different ends of electrically single wipers, a wiper having arms 1 and 2 rotating in different planes over different levels, the full line wiper arm 1 rotating over contacts denoted by the full line semicircle and the dotted line wiper arm 2 rotating over the contacts denoted by the dotted semicircle after the full line wiper arm has traversed its level of contacts. Wiper arms 5 and 6, 9 and 10, 13 and 14 rotate and engage contacts in a similar manner. These wipers form a set of speaking, test, and marking wire wipers and are connected over unoperated contacts of wiper switching relay WS. A similar pair of levels associated with wiper arms 3, 7, 11, 15 and 4, 8, 12, 16 are connected over contacts closed by relay WS when it is operated. Each level has 52 contacts, these being a normal contact at the commencement in the direction of rotation of the wipers which in the drawings are assumed to rotate in a clockwise direction, a "last" contact at the opposite end of the level and 50 intermediate contacts associated with outlets to further apparatus for instance to second selectors and outgoing junction repeaters. The normal position of the switch is shown in the drawings with the odd numbered wiper arms resting on the normal contacts of their respective levels. In this position contact on is open and in all other positions of the wipers it is closed.

The selector includes a coupling relay K and a switching relay H.

The selector is controlled by a common control circuit multipled to a number of similar selectors one of which connects itself to the common control circuit by the operation of relay K. In the control circuit is a relay JB which has contacts in each of the selector circuits accessible to it and provides a circuit over the incoming speaking wires for relay K and the impulse relay in the control circuit when the selector is taken into use and disconnects relay K from the line during impulsing.

Incoming to the selector are four wires, the positive and negative speaking wires, test wire c and wire d which may be connected at a preceding circuit containing a feeding bridge at which holding and supervision of the connection is controlled and over which a signal may be transmitted to the feeding bridge. However, in the example about to be described the first selector is taken into use directly from a line finder or subscriber's line switch and the feeding bridge will be assumed to be connected ahead of the first selector.

The common control circuit includes an impulse relay A, release relay B, dialling relay C and test relay T with an auxiliary relay TT. There is also a digit switch of the single motion reverse drive type with 25 contacts per bank, the switch having 8 banks and corresponding wipers. These are designated DS1-DS8 and the switch magnet is designated DSM. Wiper DS1 is the control wiper, DS2 the marking wiper the associated bank contacts of which are connected to marking wires connected as required to contacts in the marking banks of the selector. There are 20 marking wires, the first 10 being connected to contacts 1–10 (counting the normal contact as "0") and these are used for marking the selector for a first digit. The second 10 wires are connected to contacts 13–22 and these are used for marking the selector for a second digit, the digit switch being responsive to one or two impulse trains. In the case in which two impulse trains are received the digit switch proceeds to a sub-normal position (contacts 12) after the first digit and the selector is marked in accordance with the second digit. Wiper DS3 controls the operation of relays E, SL and PP which will be referred to shortly, wipers DS4 and 5 are concerned with the operation of wiper switching relay WS in the selector, wipers DS6 and 7 are concerned with the operation of overflow meters and differentiating between "live" and "dead" groups of outlets and tone transmission, and wiper DS8 is an off-normal wiper. The selector multiple may be divided into two parts some of the selectors served by a common control circuit being connected to one part and others to the other part. In order to provide flexibility in the arrangement of the groups in the two sets of selectors served by the same common control circuit two banks are provided for the control of the wiper switching relay and two for the control of tone transmission and overflow meters. The banks of wipers DS4 and DS6 respectively are associated with selectors multipled to the selector shown in the upper part of the drawings while the banks of wipers DS5 and DS7 are associated with selectors connected to the other part of the multiple.

Relay PP is connected to contacts in the bank of wiper DS3 and operates to bring about a preliminary rotation of the selector when a digit setting the digit switch to one of these contacts is received. The preliminary rotation is a rotation of the odd numbered wipers over their levels and the bringing of the even numbered wipers to the commencement of their levels. Relay E (right hand winding) is connected to contacts in the bank of wiper DS3 not connected to relays PP and SL to which the digit switch may be set by certain first digits. Non-operation of relay E brings about the rotation of the digit switch to a sub-normal position from which it is stepped by a further train of impulses for the marking of the selector. Relay SL is also connected in series with a winding of relay E to the bank of wiper DS3 and by its operation transmits a signal to the next selector in the chain to be taken into use to cause it to direct the connection to one of two main routes. The relay also controls the application of "number unobtainable" tone if a "dead" group is marked.

For the sake of example typical cross connections required in the digit switches are shown including those which would be required in the switches AI, EII, EIII and EFS for routing a call from a subscriber at exchange A to one at exchange E (Fig. 3). For the setting up of such a connection the figures should be arranged in numerical order from left to right, the junction being connected between the outgoing repeater (Fig. 6) and the incoming selector (Fig. 7), and the feeding bridge (Fig. 8) at exchange E being connected between the incoming selector and the pre-final selector (Figs. 9 and 10).

Since the selector is assumed to be the selector AI of Fig. 3 it is convenient that the levels selected in response to two digits (the numbers 20–29) are those associated with the even numbered wiper arms, there being 100 outlets allotted to the five groups of outlets corresponding to the first five levels from the selector AI referred to. Accordingly contact 2 in the bank of wiper DS3 will be connected to relay PP for the preliminary rotation of the selector at the end of the first impulse train. It will be noticed that in Fig. 3, switches which are taken into use in response to either of a pair of digits received at a preceding selector have their lower levels allotted to groups denoted by the odd digit of the pair. Accordingly, the preliminary rotation of the succeeding selector, be it in the same exchange or in another exchange is required when the digit causing its selection at the first selector is even. Relay SL which by its operation transmits a signal preventing preliminary rotation is connected to contacts of the digit switch reached in response to odd digits, either odd single digits or odd second digits in cases where the transmission of a differentiating signal is necessary. Outlets corresponding to levels 6 and 7 of AI may be assumed to be connected in the levels associated with wiper arms 1, 5, 9, 13 and outlets corresponding to levels 8, 9 and 10 in levels associated with wiper arms 3, 7, 11, 15. The wiper switching relay will require to be operated for single digits 7, 8, 0 and some second digits, say the digits 7–0 and suitable cross connections will be made to the bank of wiper DS4 for the purpose.

The first selector is free for use if battery potential is present on the incoming test wire, the connection being from battery over contacts $b2$, $ra1$, wiper DS8 and normal contact and contact $h4$. When the connection is switched through relays K and A operate over a preceding loop, which in the present example is assumed to be the calling subscriber's loop, the circuit including contacts $jb$ of relay JB. On the operation of relay K, contact, $k1$ connects earth to the incoming test wire to mark it engaged, contacts $k2$ and $k5$ connect relay A directly to the loop independently of contacts $jb$, contact $k3$ closes a point in the operating circuit of relay WS, contact $k4$ prepares a circuit for winding (II) of relay K, contact $k6$ closes a point in the circuit over which the signal to the succeeding circuit for main route selection is transmitted, contact $k7$ connects the test and marking wire wipers and contact $k8$ prepares a circuit for the operation of the sprag magnet SM. Due to the operation of relay A a circuit is closed at contact $a1$ for windings (I) of relays B and C, the circuit of the latter being over normal contact and wiper DS1, contact $dsm$ operated by the armature of the digit switch magnet, contact $c1$, magnet DSM, relay RA to battery. Relays B and C operate but due to the resistance of winding (I) of relay C magnet DSM and relay RA do not operate. Contact $b2$ opens a point in the test-in circuit and closes the circuit of relay JB which operates and disconnects winding (I) of relay K from the negative wire. Contacts $b3$ and $c1$ prepare the impulsing circuit for the digit switch magnet, contact $b4$ disconnects earth from the commoned contacts in the control bank, contact $b5$ prepares a circuit for the operation of relays E, SL and PP but this circuit is opened at contact $c3$ until the first train of impulses has been dialled, contact $b6$ closes the holding circuit of relay K in series with winding (I) of relay H but the latter relay is prevented from operating by the inclusion of a suitably high resistance in this circuit, contact $c2$ connects relay S to wire SA which is earthed periodically by a rotating cam or other contact closing device to initiate the measuring off of a delayed dialling period and contact $c4$ opens a point in a circuit for magnet SM. Other contacts of relays B and C are without effect at this time. The calling subscriber now receives dialling tone, the tone being applied to the positive wire over wire DT, normal contact and wiper DS6, the condenser, wiper DS7 and normal contact, contacts $k2$ and $h2$.

The calling subscriber now dials the first digit of the wanted number and relay A responds to the dialled impulses. On the release of the relay a circuit is closed from earth over contacts $a1$, $b3$, $c1$ winding (II) of relay C, magnet DSM, winding (II) relay RA to battery. The magnet operates and attracts its armature and relay RA operates closing at contact $ra2$ a circuit for lamp L in series with a slow alarm relay. At the end of the impulse relay A re-operates and magnet DSM releases its armature as it will not remain energized in series with winding (I) of relay C. The digit switch is stepped to its first contacts. At each subsequent operation and release of the digit switch magnet due to incoming impulses the switch is stepped and at the end of the train its wipers rest on contacts corresponding to the digit dialled. It now depends on the value of the digit received whether the digit switch remains on the contacts to which it was set by impulses or whether it proceeds to a sub-normal position in readiness to take a second digit. It also depends on the value of the received digit which of the relays E, SL or PP is operated. It will be assumed for the moment that the digit 2 has been received. This means that the digit switch has to respond to a second digit since only three ranks of switches are connected for local calls and the system is a five figure one, all local calls being numbered in the 2 "ten thousands" group. Outlets to local group selectors (AIII in Fig. 3) are connected as already stated in the levels associated with the even numbered wipers on the selector so that a preliminary rotation of the selector is required. Relay PP is connected to contact 2 in the bank of wiper DS3 and on release of relay C relay PP operates in a circuit over wiper DS3, contacts $c3$, $lc2$, $pp2$ and $b5$ and locks up over front contact $pp2$. A circuit is now closed from earth over contacts $t1$, $tt4$, $pp3$, $k3$, $h1$, magnet SM, winding (I) of relay RA to battery. Magnet SM operates and rotates the selector wipers. As soon as the selector leaves its normal position contact $on$ opens, and rotation continues until the odd numbered wiper arms have traversed their levels and the even numbered wiper arms have reached the contacts at the commencement of their levels, this being a sub-normal position whereupon a circuit is closed from earth over rectifier R, relay T, sub-normal contact and wiper arm 14, contacts $ws5$, $k7$, $ws4$, wiper arm 10, sub-normal contact, contact $pp6$, resistance to battery. Relay T operates in this circuit and opens the circuit of magnet SM which stops the selector. Relay TT does not operate as contact $pp5$ is open. Meanwhile, contact pp4 having changed over, earth is connected thereover and over contact e3 and commoned contacts in the control bank, wiper DS1, contacts dsm and c1 to magnet DSM and the digit switch self steps to its twelfth contacts or sub-normal position where its magnet circuit is opened. It therefore comes to rest on the twelfth contacts. In this position a circuit is closed from earth over contact pp1 wiper DS3 for relay E (right hand winding) and relay E operates and prepares a locking circuit for itself at contact e1. Contact e2 connects winding (I) of relay C to the twelfth contact in the control bank and relay C operates in series with magnet DSM. Contact e3 disconnects earth from the commoned contacts in the control bank and contact e4 prepares an alternative circuit for magnet SM. Contact e5 closes a point in a circuit over marking wiper DS2 and contact e6 in conjunction with contact c6 connects winding (II) of relay PP to the sub-normal contact in the level associated with wiper arm 10 of the selector. This winding is now energized and being wound in opposition to winding (I) the relay is released and contact pp6 opening relay T releases.

The second impulse train is now received and the digit switch is stepped in accordance with the number of impulses received to mark a group of outlets in the dotted levels over one of the marking wires connected to contacts 13 to 22 in the marking bank. At the end of the train relay C releases and the sprag magnet is energized in a circuit over contacts c4, and e4 and the back of contact pp3. Relay T is connected over contacts c5 and e5 to wiper DS2 and thence over one of the second set of 10 marking wires to a marking bank of the selector. The selector is rotated, due to energization of magnet SM, in search of a free outlet in the marked group, a free outlet being denoted by the presence of battery potential on the test bank contact. When such an outlet is encountered relay T operates over the marking banks of the digit switch and selector, wiper arm 14 or 16, contacts ws5, k7, ws4, test wiper arm 10 or 12, to battery on the test bank contact. The circuit of magnet SM is opened at contact t1 and the selector is stopped and relay TT is connected in parallel with relay T and operates and locks up over contact tt1. Contact tt2 closes a short circuit over contact lc4 about the resistance in the holding circuit of relay K and relay H operates by means of its winding (I) included in this circuit. Contact tt4 opens a further point in the circuit of magnet SM. Relay H operating, the speaking wires are switched through at contacts h2 and h3 and the test wire at contacts h4 and h5. Contact h1 disconnects magnet SM and connects earth over contacts on and k8 when relay K releases to wire d but this is without effect in the example considered and will be more fully explained in connection with Figs. 8 and 9.

Depending on whether the second digit was odd or even relay SL will be operated over wiper DS3 and one of the later bank contacts for the transmission of a signal to the succeeding selector to choose one of two main routes. Also depending on the value of the second digit, that is if it is one of the digits 7 to 0 in the assumed case relay WS will be operated the circuit for this being from earth over contacts pp4, b1, wiper DS4, and contact k3. If relay WS is operated it changes over the wiper connections at contacts ws2 to ws5 and at contact ws6 connects a buzzer to the test jack for the ready determination of the wiper set in use and on the operation of relay H locks up over contacts ws1 and h6.

Before continuing with the subsequent operations at the selector it will be convenient to refer to the operations involved if the first digit is other than 2.

The first digit 1 is not used and if it should be dialled in error relay E is operated to prevent a second digit being received at the digit switch. The selector is rotated to its last contact position without preliminary rotation and a tone is transmitted to the calling subscriber in a manner to be hereafter described. If any other digit be dialled relay E is operated over the relevant digit switch contact in the bank of wiper DS3 and the relevant group of contacts is marked over wiper DS2 and search in the marked group for a free outlet takes place, relay T operating when a free outlet is found to stop the selector. If the digit is one of the digits 3 or 5 relay SL will be operated in series with relay E for the transmission of the signal to the succeeding selector to choose the main route to be taken while if it is one of the digits 7, 8, 0 relay WS will be operated to switch over the wipers. The signal for route selection at a subsequent selector is given by the connection of earth over contacts b5, pp2, sl3, tt3 and k6 to the negative speaking wire and this shunts a relay connected to the positive speaking wire (there being a preceding loop circuit) at a subsequent selector. The effect of the signal will be more clearly apparent from the consideration of subsequent selector circuits.

When relay H is operated and the connection is switched through a relay in the succeeding circuit is operated and applies or brings about the application of earth to the test wire incoming thereat to hold the connection. The earth on the test wire energizes winding (II) of relay H and short circuits relays T and TT. Relays A, T and TT now release followed by B, K, E and SL if operated.

The connections between the selector and the common control circuit are opened and a homing circuit for the digit switch is closed over contacts b4, commoned contacts, wiper DS1, contacts dsm, c1 and magnet DSM and if the switch has to pass over its 12th contacts a circuit is closed over contacts a1, b3, e2 and the 12th contact in the control bank to step the switch over this contact position. When the switch reaches its normal position the homing circuit is opened at wiper DS1.

At the end of the conversation the calling loop is opened by the calling subscriber replacing his receiver and earth is disconnected from the test wire at the feeding bridge circuit releasing relay H. Relay WS (if operated) is released, the through circuit is opened and a circuit for magnet SM is closed from earth over contacts on, k8, h1, magnet SM, winding (I) of relay RA to battery. The selector is rotated until the wipers again reach their normal position whereupon contact on opens and the selector is brought to rest. During homing of the digit switch and selector relay RA is operated to guard against irregular seizure, the test in circuit being opened at contact ra1 in the common control circuit.

If, during search in a marked group no free outlet is found the selector continues to rotate until the last contacts in the dotted levels are reached. A circuit is now closed for relay T over contacts $c5$, $e5$, last contact and wiper arms 14 or 16 and 10 or 12, and relay LC. Relay T operates in series with relay LC, stops further rotation and operates relay TT and a busy signal is transmitted over wire BT, contacts $s12$, and $lc1$ and the positive wire. Contact $lc4$ opens to prevent operation of relay H and contact $lc3$ connects earth over contacts $b5$, $pp2$, $tt3$, $k6$, the negative speaking wire and wiper, wiper DS6, cross connection to terminal $om$ thence to the overflow meter OM which is thereby operated if the group marked is a "live" group. Busy tone may alternate with the busy flash signal in the well known manner and during the flash period relay B is held by means of its winding (II) over contacts $sl1$, $lc2$, and wire BH to which battery is connected during the flash period. If the group marked is a "dead" group, the relevant contact in the bank of wiper DS6 would be connected to terminal $sl$, thence to winding (I) of relay SL and this relay would operate connecting at contact $sl2$ N.U. tone over wire NUT in place of busy tone.

If the subscriber delays dialling or a loop on the subscriber's line occurs, relay S is operated by means of its winding (I) on the next application of earth to wire SA by the periodically operated contact device after the operation of relay C and at contact $s2$ connects winding (I) of relay SL to wire ZA to which earth is connected momentarily on the elapse of a predetermined interval after its application to wire SA.

Relay S locks up over its winding II, contact $s1$, wiper DS3 in its normal position, contacts $pp2$ and $b5$ and at contact $s3$ connects earth over operated contact $sl1$, $c1$ and winding (II) of relay C to magnet DSM which steps the digit switch from normal when relay SL releases on the disconnection of earth from wire ZA. Relay C is then released and relay E is operated over wiper DS3 and first bank contact. Relay T is connected to the first marking wire and the selector is rotated. Contacts marked over this wire are connected to special circuits to one of which the selector tests and is brought to rest and relay H is operated as for a free outlet. The common control circuit is released and after an interval an alarm is given from the special circuit. When the loop is opened earth is disconnected from the test wire in the special circuit and the selector is restored to normal. Should all the special circuits be busy the selector rotates to the last contact position in which relay LC operates and in conjunction with relay SL operated over wiper DS6 the N.U. tone is applied to the line. In this case the common control circuit is not automatically released until the loop has been opened or the fault cleared but it may be released manually by an attendant whose attention is drawn to the condition by means of an alarm.

The rectifier R in the circuit of relay T is provided to meet the case in which the selector precedes the circuit controlling holding and supervision to prevent operation of relay T should the selector pass a contact at the time a booster battery metering impulse is being transmitted over it.

For the setting up of a call from exchange A to exchange E the first selector will seize a free junction terminating in an incoming selector such as that shown at EII in Fig. 3 and an outgoing repeater (Fig. 6) connected to the junction at exchange A will supply feed current and control the connection at that exchange. Further the first digit dialled will have been 5 or 6 and for a call to a subscriber connected to final selector EFS it will have been 5 and relay SL will have been operated to transmit the signal to prevent preliminary rotation of the incoming selector.

Referring now to Fig. 6 it will be seen that battery is connected over contacts $b1$, $bd1$, $c1$ and $br1$ to the incoming test wire at the repeater if the junction is free and when the connection is switched through at the preceding selector relay A operates from earth on the negative wire applied by the operation of relay SL assuming the call to be for a subscriber connected to selector EFS. Relay P is short circuited at this moment and does not operate. Contact $a1$ closes a circuit over contacts $br5$ and $b4$ for slow releasing relay BD, contact $a2$ closes a point in the junction circuit and contact $a3$ connects earth over contacts $br3$ and $p2$ to the positive wire of the junction. Relay BD operates, disconnects battery from the incoming test wire and connects earth thereto at contact $bd1$ for holding the switching relay in the preceding selector and at contact $bd6$ operates relay HA in series with the polarizing winding of the shunt field answering supervisory relay D. Contacts $ha1$ and $ha2$ close the junction circuit and earth over contact $a3$ repeats the signal to the incoming selector. Contact $bd7$ removes a short circuit from relay P but this relay is still short circuited by the signal earth on the negative wire. Consequent on the closure of the junction circuit relay I operates in series with the line winding of relay D and the battery connected winding of relay A in the incoming selector and at contact $i1$ closes a circuit over contact $bd2$ for release relay B. Relay B operates, locks up over contact $b4$ and at contact $b5$ closes a holding circuit over contacts $d1$, $dd4$, $i2$ and $bd3$ for relay BD. Contact $b1$ closes a point in the circuit over which booster battery metering impulses are transmitted, contact $b2$ holds relay HA independently of relay BD, contact $b3$ prepares a circuit for dialling relay C, contact $b6$ closes in parallel with contact $c1$ and contact $b7$ applies a further short circuit about relay P. The signal earth is now removed at the preceding selector.

On receipt of the first impulse to be transmitted over the junction relay C operates, closes a low impedance impulsing loop over the junction at contact $c2$, holds relay BD at contact $c4$ against release of relay I, and connects winding (II) of relay P in series with relay HA at contact $c5$. Impulses are repeated over the junction at contact $a2$ which is of the make-before-break type and in its back position connects a non-inductive resistance across relays D and I to form a discharge circuit to prevent current surges due to the first impulse break having a detrimental effect on relay A. Relay P operates by means of its winding (II) and removes the earth connection to the junction at contact $p2$ and locks itself over contact $p1$ independently of relay C. At the end of the impulse train relay C releases but relay BD is held by the re-operation of relay I over the junction loop. All the impulse trains for the setting up of the connection are repeated in a similar manner and when the called subscriber replies to the call the direction of current flow over the junction is reversed at the incoming exchange and relay D thereupon operates. Contact d1 disconnects relay BD and on the release of that relay slow releasing relay DD is operated over contacts bd4, d1 and b5. Contacts dd2 and dd3 reverse the polarity of the incoming speaking wires and contact dd1 closes the metering circuit. When relay B operated a circuit was closed over contacts b5, dd5 and bd5 for metering relay J which locked up over contact j3 independently of relay BD and at contact j1 prepared the metering circuit. On the operation of relay DD the circuit of relay J is opened and a metering impulse is transmitted over wire BB during the release period of relay J.

At the end of the conversation release is initiated by the calling subscriber replacing his receiver and relay A releases on the opening of the loop. Relays D and I release consequent on the opening of the junction circuit and are followed by relay DD. Relay C re-operates and on the release of relay B due to the falling back of contact a1 earth is disconnected from the test wire. Closure of the back of contact b3 re-operates relay BD over contact c3 which at contact bd1 prevents immediate connection of battery to the test wire on the release of relay C which is initiated when relay BD operates. When relay C releases the circuit for relay BD is opened and after a brief interval that relay releases and re-connects battery to the test wire and releases relays HA and P.

If the called subscriber's line is found engaged a busy tone and lamp flash signal is transmitted from the incoming exchange, the latter signal comprising a periodical battery connection to both wires of the junction. At the first application of the flash signal relay I releases and releases relay BD. When the loop condition is again restored relay I re-operates and relay J being held relay BR operates over contacts j2, bd3, i2, dd4, d1 and b5. Contact br1 opens the metering circuit and connects earth directly to the test wire, contact br2 repeats the tone and flash signals by connecting the positive wire over wire BT to a contact to which the secondary winding of a tone transformer and battery are connected alternately at periodic intervals. Contact br3 connects earth to winding (II) of relay BR to hold it over wire BH during the period in which battery is connected to wire BT and contact br5 connects winding (I) of relay BR in a holding circuit during the tone period and releases relay B. Contacts b2 and bd6 being both open relay HA releases and opens the junction circuit initiating release of the apparatus in the incoming exchange. Relay C is operated during flash periods over contact br4. The apparatus at the outgoing exchange is held until the caller clears whereupon if this takes place in a tone period or if it takes place during a flash period then in the next tone period relay BR releases and the release of preceding switches is initiated. During the release period of relay C relay BD operates to delay connection of battery to the test wire. When contact c3 opens relay BD is de-energized and when it releases the battery potential on the test wire is restored.

If relay P is not short circuited when the junction is seized contact p1 connects winding (II) of the relay in a holding circuit which is closed when relay BD operates. Contact p2 disconnects earth from the junction positive wire to prevent transmission of the route selecting signal.

Figure 7:
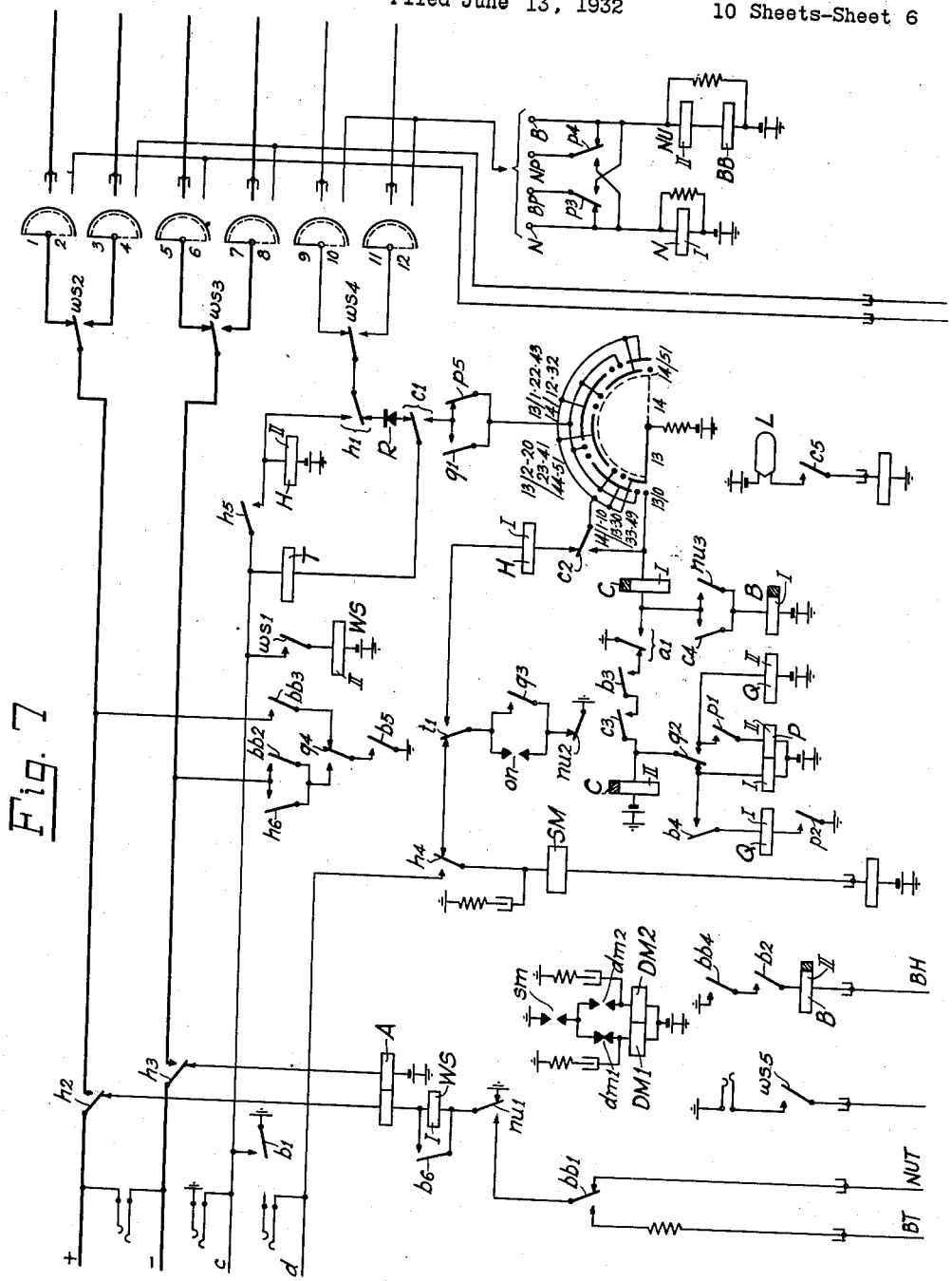

The incoming end of the junction is connected to an incoming selector (in exchange E in the assumed case) and this selector is of the type shown in Fig. 7 to which reference should now be made. This selector is provided with speaking, test and marking wire wipers and banks similar to the selector shown in Figs. 4 and 5 but there is a single marking bank only comprising a double armed wiper similar to the wiper arms 1 and 2 and a pair of levels. The rotation of the selector is carried out by magnets DM1 and DM2 acting on a rotating armature and is under control of the sprag magnet SM. All the apparatus for controlling the selector is individual to it, there being no separate digit switch, the selector acting as its own digit switch.

As regards outlets, groups of outlets forming one main route are connected to the pair of levers shown as full line and dotted semicircles selectable with relay WS unoperated and groups of outlets forming a second main route are connected to a similar pair of levels selectable with relay WS operated. The groups are arranged in numerical order in the levels the earlier numbers appearing in the full line levels and the later numbers in the dotted levels, a group of outlets being selectable in response to either of a pair of digits. Correspondingly numbered groups in each main route are connected in the same positions in the two sets of banks the choice between the two routes selectable being made consequent on the receipt or non-receipt of the route selecting signal.

The connections to the marking bank will now be briefly referred to. The contacts at the commencement of the level associated with wiper arm 13 (the earlier level) and at the end of the level associated with wiper arm 14 (the later level) are normal contacts, the former being connected to dialling relay C. Contacts 1, 22 and 43 in the earlier level and 12 and 32 in the later level are stopping contacts and are commoned and connected over contacts of relays P and Q and a front contact of the dialling relay to test relay T, contacts 21, 42 and 11, 31 and 50 in the respective levels are last contact positions at the end of each group and are unconnected and the remainder of the contacts are connected over the back of contact c2 to winding (I) of switching relay H. The switch rotates over a group of contacts in response to a pair of impulses since a group of outlets is selectable by either of a pair of digits and commences to rotates as soon as an impulse is received determining that the wanted group lies ahead of the group at the commencement of which the wipers are resting. Rotation commences at the end of an odd impulse and continues during receipt of each subsequent even impulse until impulsing ceases the switch stopping at one of the stopping points should it reach one before the end of an even impulse. The single impulses are converted into pairs by the relays P and Q, both relays being operated at the end of an odd impulse and neither at the end of an even impulse. The route selecting signal takes effect on relay WS a winding of which is connected in series with a winding of the impulse relay A connected to the positive wire, receipt of the signal preventing operation of relay WS and causing selection to take place over the wipers connected to the back contacts of wiper switching relay WS. If no signal is received relay WS operates over a preceding loop and causes selection to take place over the wipers connected to the front contacts of relay WS.

Incoming wires c and d are provided as the selector may in some instances be preceded by a bridge circuit similar to that shown in Fig. 8.

The selector having been seized over the junction relay A operates over its right hand winding and the negative wire and a preceding loop either to earth such as that connected to the positive wire at the outgoing repeater over contacts br3, p2 and a3 thereat or over a preceding loop to earth connected to the positive wire over contact nu1, winding (I) of relay WS and the left hand winding of relay A in the selector concerned. Contact a1 closes a circuit for winding (I) of dialling relay C over the normal contact and wiper arm 13. Relay C operates and at contact c1 connects test relay T to the stopping points in the marking bank. Contact c2 disconnects winding (I) of relay H and connects the winding (I) of relay C to the intermediate contacts in the marking bank to hold it after the termination of impulsing until the switch is in front of the required group, contact c3 closes a point in a circuit for relay P, contact c4 closes a circuit for release relay B and contact c5 connects alarm lamp L in series with a delayed alarm relay. Relay B operates, connects earth to the test wire at contact b1, prepares a circuit for relay P at contact b3 and for relay Q at contact b4 and short circuits winding (I) of relay WS at contact b6. For a call to a subscriber connected to the final selector EFS (Fig. 3) relay WS will be short circuited at the time of seizure by the earth applied at the outgoing repeater consequent on the operation of relay SL in the first selector. The main route in which selection is to be made is therefore that attainable by the wipers connected to the back contacts of relay WS.

The first impulse is repeated over contacts a1, b3, c3, q2 to winding (I) of relay P and this relay operates, preparing a circuit for winding (I) of relay Q at contact p2. Contact p1 prepares a circuit for winding (II) of relay P which is wound in opposition to its winding (I) and contact p5 opens the marking circuit. At the end of the impulses relay Q operates in series with winding (I) of relay P and at contact q2 connects windings (II) of relays P and Q to the back of contact a1. Contact q1 closes in the marking circuit, and contact q3 closes a circuit from earth over contacts nu2, t1, h4 for the sprag magnet SM. During impulsing relay C is held by the energization of its winding (II) over the back of contact a1. The sprag magnet operates and the selector commences to rotate but it is stopped on contact 1 by the operation of relay T in a circuit from earth over contact b1, relay T, contacts c1, q1, contact 1 and wiper arm 13 to battery. It waits here until the 3rd impulse (if there is one) arrives which determines that the group immediately ahead of the wipers and corresponding to digits 1 and 2 is not that required. At the commencement of the second impulse windings (II) of relays P and Q are energized. Relay P releases due to differential action but relay Q remains held until the end of the impulse whereupon it releases. Contact p5 closes before contact q1 opens and relay T remains energized. At the commencement of the third and subsequent odd impulses relay P energizes, releases relay T at contact p5 and contact t1 closing the selector commences to rotate immediately, off-normal contacts on being now closed. The selector is rotated to the next stopping point whereupon relay T operates as before. At the end of the impulse train the test relay circuit is opened by the release of relay C and the selector again commences to rotate and continues to rotate until a free outlet in the selected group is found whereupon relay T operates to stop the switch in a circuit from earth over contact b1, relay T, back contact c1, rectifier R, contacts h1 and ws4, test wiper to battery on the test bank contact. It should be noted that the release lag of relay B must be long enough to cover the searching time over a group of outlets as its circuit is opened at contact c4 on the release of the dialling relay. Relay H now operates in a circuit from earth over contacts nu2, on, t1, winding (I) of relay H, contact c2 commoned intermediate contacts and marking wiper to battery. Contact h5 connects winding (II) of relay H to the test wire and that relay holds thereto. Contact h1 connects the test wire to the test wiper and the outlet is marked engaged and relay T is disconnected. The sprag magnet circuit is opened at contact h4 which extends earth to wire d and the speaking wires are switched through at contacts h2 and h3 and relays A and B are released. Relay H is held by earth connected to the test wire at the succeeding circuit.

Since a group is selected in response to either of a pair of digits it will be necessary to direct the succeeding selector to one of two main routes depending on which digit of the pair is received. If an odd digit is received relays P and Q remain operated over their windings (I) and earth is connected over contacts b5, q4, h6 to the negative wire for the transmission of the route selecting signal. If an even digit is received relays P and Q will be unoperated and no signal will be transmitted.

If no signal is received at the incoming selector relay WS operates in series with relay A and locks up over its winding (II) and contact ws1 to the test wire on the operation of relay B. Its winding (I) is then short circuited at contact b6 to lower the resistance of the impulsing circuit. If a signal is received relay WS is prevented from operation after the signal earth is disconnected by contact b6. Contacts ws2–ws4 change over and selection is made in a marked group over the wipers connected to the front contacts of relay WS. Contact ws5 connects the test jack to a buzzer to inform a test clerk which wiper set is in use.

The "last" contacts of each group are connected as follows:—in the speaking wire banks to overflow meters, one for each group of outlets, in the test wire banks to terminals N, BP, NP, B as required and in the marking bank are unconnected. Terminals N and B are connected directly to relay NU (winding (I)) and to relays NU (winding (II)) and BB respectively. Terminals BP and NP are connected over back contacts of relay P to terminals N and B respectively and over front contacts of relay P to the same terminals in reverse order. Cross connections from the test banks to these terminals are made as required relay NU being connected alone to "dead" groups for the giving of N.U. tone and in series with relay BB to "live" groups for the giving of busy tone. The contacts of relay P provide for different tones being given from the last contacts of a group of outlets according to the digit received which gave access to the group since a single group is selected in response to two digits, and the route at a succeeding selector in response to one of them may be a spare one.

If the selector fails to find a free outlet it is stopped in a last contact position by the operation of relay T over the test wiper and one of the relays connected to the last contacts in the test banks. If the group is a "live" one but all the outlets are engaged the test bank contact will be connected to winding (II) of relay NU and relay BB over one or other of the terminals BP, NP, B. The relays NU and BB will operate in series with relay T but the "last" contact in the marking bank being unconnected relay H will not be operated. A busy tone will therefore be transmitted over wire BT, contacts bb1, and nu1. This tone may alternate with the busy flash signal which is a battery connection to the positive wire and during the flash period relay B is held by means of its winding (II) over contacts bb4 and b2 to wire BH to which battery is connected during the flash period. Earth is connected over contacts b5, q4 and bb2 or bb3 to the negative or positive wires for the operation of the overflow meter. If the group in which the selector failed to find a free outlet is a spare group or gives access to a spare group at the succeeding selector relay NU would be operated alone over its winding (I) and the caller would receive N.U. tone over wire NUT, contacts bb1 and nu1. Relay B is held during the application of tone by contact nu3 in a circuit for its winding (I).

When the calling subscriber clears earth is disconnected from the test wire if the call has been extended to a succeeding selector or the loop to relay A is opened if the selector met congestion or a spare group was dialled. In the former case relay H releases and closes the circuit for magnet SM which rotates the selector to normal at which position it is stopped by the opening of contact on. In the latter case relay A releases and releases relay B which by disconnection of earth from the test wire releases relays T, NU and BB if operated. Contacts nu2 and t1 close the circuit for magnet SM and the selector is rotated to normal.

The incoming selector gives access to a group or pre-final selector and it is convenient to connect the feeding bridge to the wires incoming to the pre-final selector. The bridge circuit shown in Fig. 8, which should now be referred to, provides a through circuit for the transmission of impulses and route selecting signals forward and for tone and lamp flash signals backwards as the feeding bridge is only connected up when the final selector has tested into a free line.

The battery potential indicating a free pre-final selector is applied to the test bank contact of the incoming selector over the through test wire c in the bridge circuit and when the connection is switched through a metallic circuit will be found over the speaking wires and back contacts b4 and b5 to the impulse relay A and coupling relay K in the pre-final selector. When the pre-final selector switching relay H operates earth is connected to wire d but since earth is also connected to wire c winding (I) of relay H is short circuited and nothing further happens at this time. Relay H is of low resistance and the earth applied over its winding to the test wire c holds the connection when the potential of wire c is reversed at the final selector and until the holding earth is applied by relay B. When the final selector switching relay operates earth is disconnected thereat from the test wire c and battery is connected thereto and relay H in the bridge circuit operates by means of its winding (I) to earth on wire d. Contact h1 closes a circuit for release relay B and contact h2 prepares a circuit for metering relay J. Relay B operates and at contact b1 connects the holding earth to the test wire. Contacts b2 and b3 connect feed relay A to the incoming wires and contacts b4 and b5 disconnect the through impulsing and signalling circuit over the speaking wires and connect the outgoing wires over contacts f2 and f3 of ring tripping relay F and contacts a2 and a3 of feed relay A, now operated over the preceding loop, to the ringing circuit. Contact b6 closes the circuit of relay J which operates and closes a point in the metering circuit at contact j1, locks up to wire d over contact j2 and connects ringing tone to the positive wire at contact j3. Relay B is now held over contact a1. The called subscribed is rung from the ringing circuit, one wire including winding (I) of relay F, and when the called subscriber replies relay F operates round the called loop, connects its second winding in circuit by opening contact f1 and cuts off the ringing current and switches the connection through at contacts f2 and f3. Ringing tone is cut off at contact f5 and a connection is made to lamp CSH at contact f4. Answering supervisory relay D operates over the called loop and at contact d1 closes the metering circuit in the case of a local call. Contacts d2 and d3 reverse the polarity of the incoming speaking wires to repeat the answering supervisory signal to the outgoing exchange and contact d4 opens the circuit of relay H. Relay H releases and opens the circuit of relay J. The release period of relay J measures off the booster battery metering impulse over wire BB.

When the calling subscriber clears relay A releases and is followed shortly after by relay B which disconnects earth from the test wire to release the other selectors used in the connection in the exchange. The through impulsing and signalling circuit is restored and relays D and F are released.

If the called subscriber clears first relay D releases and earth on wire d is connected over contacts d4, j2, f4 and lamp CSH to an alarm relay. The lamp lights and if the connection is not cleared within a prescribed interval an alarm is given.

If the called subscriber is busy or the pre-final selector is unable to find a free outlet relay H is not operated and no circuit changes take place and busy and other tone signals have a clear path over the speaking wires without the necessity of repetition.

The individual part of the group or pre-final selector shown in Figs. 9 and 10 is identical with the first selector shown in Figs. 4 and 5 and the common control circuit is arranged on similar lines to that controlling the first selector. The principal difference between the two circuits is that the group or pre-final selector responds to one train of impulses only and selects in accordance with the digit dialled and a signal received from the preceding selector. The selector gives access to two main routes, one or other of the routes being selected in accordance with a received signal. Outlets in one route are connected to the levels denoted by the full line semicircles and outlets in the other route are connected to the levels denoted by the dotted semicircles, and associated wiper arms being represented by full and dotted lines respectively.

Since each level contains only 50 contacts connected to outlets a level cannot be evenly divided amongst groups of outlets and in order that there may be no limitation to the number of outlets in a group by reason of this, arrangements are provided whereby the earlier outlets in the divided group are connected at the commencement of a level accessible with the wiper switching relay unoperated and the later outlets are connected to the later contacts of the corresponding level accessible with the wiper switching relay operated. This operation is controlled by relay SG in the common control circuit.

There are 20 marking wires from the marking bank of the digit switch in the common control circuit providing for the marking of any one of a number of groups of outlets not exceeding twenty. The marking wires from the odd numbered marking bank contacts are used for groups of outlets in one main route and those from the even numbered contacts for groups of outlets in the other main route. For selection in one main route, corresponding to the odd digit of a pair received at the preceding selector, a signal is transmitted from the preceding selector preventing operation of relay P and selection takes place in a marked group in the earlier levels encountered while for selection in the other main route no signal is received and relay P operates causing a preliminary rotation of the selector to bring the even numbered wiper arms to a sub-normal position at the commencement of their associated levels. The particular wiper set to be used is determined by the digit dialled.

The selector tests free by reason of battery potential on the test wire c applied over contact c4, wiper DS3 of the digit switch and normal contact, contacts ra1 and h4 and when the connection is switched through at the preceding selector a circuit is closed for relay K over its winding (I) and the negative wire either to earth thereon at the preceding selector or over a preceding loop and relay P to earth at contact lc1. Relay K operates and at contacts k2 and k5 connects relay A to the incoming speaking wires and at contact k1 connects earth to the test wire to mark the selector engaged and to hold the preceding selector. Contacts k3 to k8 make various connections between the selector and the common control circuit.

It will first be assumed that at the time of seizure earth is connected to the negative wire and relay P is unoperated. On the closure of contact k5 relay A operates in parallel with relay K and operates relays B and C over their windings (I). Contact b1 closes circuits for relays JB and BB and the former operates to disconnect all the K relays in the selectors served by the common control circuit. Relay BB prepares the impulsing circuit to the digit switch magnet DSM in conjunction with relay C, prepares the marking and test circuit, a circuit for the sprag magnet SM and a circuit for winding (I) of relay SL. Relay B at contact b2 closes a holding circuit for relay K over its winding (II) but owing to the resistance included in this circuit winding (I) of relay H is not sufficiently energized to permit it to operate. It also lights the supervisory lamp AL. Contact b3 short circuits relay P and connects in circuit the left hand winding of relay A the earth on the negative wire at the preceding selector having by this time been removed. Relay SG is operated by the closure of contact c6 and wiper DS3 is disconnected at contact c4.

The digit switch responds to impulses. It takes two steps per impulse after the first if relay PP is unoperated and two steps for all impulses if relay PP is operated. The magnet DSM is energized over contacts a1, bb2, c1, low resistance winding (II) of dialling relay C and relay RA and at the end of the impulse releases its armature and steps the wipers to the first contacts. Winding (I) of relay C is now disconnected and the relay remains operated due to energization of its winding (II) during impulsing. Succeeding impulses step the switch as before but at the end of each impulse the wipers are stepped on to even numbered contacts to which earth is connected over the back of contact pp3 and contact c5. Magnet DSM is again energized from earth over contact pp3 and even numbered bank contact, wiper DS1, self-interrupting magnet contact dsm, and winding (II) of relay C and the switch self steps to the next contact an odd numbered one. At the end of the impulse train the switch wipers will be resting on odd numbered contacts. When relay C releases a circuit is closed for magnet SM from earth over contacts t1, tt4, c3, bb3, pp2, k8, and h1 and the magnet operates and starts the selector rotating. Rotation continues until a free outlet in the group marked is reached whereupon relay T operates in a circuit from earth over rectifier R, relay T, contacts pp4, bb4, wiper DS2, marking wire, marking level and wiper arm 13 or 15, contacts ws5, k7, ws4, wiper arm 9 or 11, test bank contact to battery connected thereto. Contact t1 opens the sprag magnet circuit and the selector is stopped and relay TT is connected to wiper DS2 and operates and locks up over contact tt1. The circuit of magnet SM is further opened at contact tt4 and at contact tt2 the resistance in the circuit of windings (II) of relay K and (I) of relay H is short circuited and the latter relay is fully energized. Contact h4 connects earth on the test wire to winding (II) of relay H which energizes and the relay is held to the test wire, contact h5 extends this earth to the test wiper to mark the outlet engaged and contacts h2 and h3 disconnect relay A and switch the connection through. Relays T and TT are short circuited by the earth on the test wiper and release after a brief interval.

Relay A being disconnected releases releasing relay B which in turn releases relays K, JB and BB. A self-interrupting circuit is now closed for magnet DSM over contacts a1, bb2 and the odd contacts and over contacts bb5 and c5 and the even contacts and wiper DS1 and the switch is rotated to its normal position. When relay K releases earth is connected over the now closed off-normal contacts on of the selector, contacts k8 and h1 to wire d to prepare relay H in the bridge circuit for operation.

If relay P is operated in series with relay K at the time the selector is taken into use denoting a call to a route to be reached over the even numbered wiper arms, contact p1 prepares a circuit for relay PP which is closed at contact b4 on the operation of relay B and relay PP operates and locks up over contact pp1. Relay P is short circuited by the closure of contact b3 and releases. Contact pp2 closes a circuit over contacts t1, tt4, k8 and h1 for magnet SM and the selector is rotated until the sub-normal position is reached whereupon a circuit is closed from earth over the rectifier R, relay T front contact pp4, sub-normal contact and wiper arm 14, contacts ws5, k7, ws4, wiper arm 10, resistance to battery. Relay T operates to stop the selector but relay TT does not operate as contact pp5 is open.

When relay PP operates contact pp3 disconnects earth from the even numbered contacts in the digit switch control bank and connects earth to the odd numbered contacts. Consequently at each impulse, including the first a self stepping circuit is closed over the odd numbered contacts so that at the end of the impulse train the wipers will rest on an even numbered contact and one of the wires connected to the dotted levels will be marked. Contact pp6 operates relay SG. The selector remains in the subnormal position until the impulse train has been received whereupon relay C releasing contact c2 connects winding (II) of relay PP to the test bank contact. This winding acts in opposition to winding (I) and the relay is released. Relay T releases and contact pp2 closing in its back position magnet SM operates and the selector starts in search of the marked contact and operations proceed as before described.

If the group marked is a divided group the relevant contact in the bank of wiper DS4 is connected over contacts sg1 and k3 to wiper switching relay WS. The earlier contacts in the group are first searched and if a free outlet therefrom is found relay H is operated to release relay A which holds relay SG over the back of contact a1, contacts bb2, sg3, and c6 until relay K is released. If no free outlet is found rotation of the selector continues until the remainder of the group connected in the later part of the corresponding level accessible over operated contacts of relay WS are reached. Relay SG is so designed as to hold for a period covering search over the earlier contacts and to release before the later contacts are reached. On its release relay WS is operated, switches over the wiper sets, to enable search to be made over test wiper arm 11 or 12.

Groups of outlets wholly connected in levels accessible to the wiper set connected to the front of contacts ws2-ws5 have their relevant contacts in the bank of wiper DS4 of the digit switch connected directly to contact k3 so that relay WS is operated at the end of the impulse train. Relay WS locks up over contacts ws1 and h6 when a free outlet has been found.

For the purpose of selecting a main route at the succeeding selector, since a group of outlets is common to a pair of digits differentiation between the digits is required. For this purpose the route selecting signal is transmitted or not as described for the preceding selectors. For digits requiring the transmission of the signal the relevant contacts in the bank of wiper DS3 are connected to relay SL (winding (I)) and on the release of the dialling relay relay SL operates from earth over contacts bb1, lc3, wiper DS3, contact c4 to battery and when a free outlet has been found by the selector earth is connected over contacts sl2, tt3, and k6 to the negative wire for the transmission of the signal.

Relay SL is also used for the purpose of transmitting a N.U. tone instead of busy tone should a spare number digit have been dialled. The operations concerned in this case also when no free outlet is found by the selector take place as described for the first selector.

When the calling subscriber clears earth is disconnected from the test wire and relay H releases closing the circuit of magnet SM and the selector is rotated to its normal position as previously described.

The final selector (Fig. 11) comprises an individual selector and a common control circuit with digit switch. The individual selector is of the same general type as the pre-final selector shown in Figs. 9 and 10 and is rotated by a rotatable armature under the action of magnets DM1 and DM2, the starting and stopping of the selector being controlled by the sprag magnet SM. The selector has 2 sets of wipers and corresponding levels of contacts, each wiper set comprising speaking and test wire wipers, a wiper having two arms rotatable in parallel planes, the arm shown as a full line engaging with a level of contacts denoted by a full line semicircle and the arm shown as a dotted line engaging the level denoted by a dotted semi-circle, the full line or odd numbered wiper arms traversing their levels before the dotted line or even numbered wiper arms engage their respective levels. There is a single pair of wiper arms and corresponding levels for marking purposes the levels having 100 marking wires connected to them, the marking contacts corresponding to the 100 subscriber's lines selectable in response to the last two digits in the directory number. Differentiation between the two sets of 100 lines is effected by the route selecting signal transmitted by the pre-final selector, the signal taking effect on relay P in the common control circuit, which controls wiper switching relay WS to connect up one or other wiper set.

In the common control circuit the digits are recorded on a digit switch which takes two steps per impulse of the "tens" train and one step per impulse of the "units" train. The "tens" digit operates one or more of three digit relays W, X, Y which select one of five marking banks of the digit switch over which the selector is marked in accordance with the "units" digit, the digit switch being rotated to a sub-normal position between the two trains of impulses. Besides the five marking banks the digit switch has a control bank and wiper DS1, a wiper DS2 the bank contacts of which are connected to the digit relays and a wiper DS3 over which relay F and the sprag magnet of the selector are controlled.

The selector tests free by reason of a battery connection over contacts ra1, b1, f1, c2, e1, wiper DS2 and normal contact and contact h1 of the selector switching relay H to the incoming test wire c and when the connection is switched through relay K operates over the negative wire to earth thereon at the pre-final selector circuit or over a preceding loop and relay P to earth over contact lc2. Relay K operates and connects earth over contacts k1 and h1 to the incoming test wire to mark the selector engaged and to hold preceding switches, contact k3 prepares a locking circuit for relay K over its winding (II), contacts k5 and k6 connect relay A to the speaking wires independently of relay JB and other contacts of relay K make various connections between the selector and the common control circuit. Relay A operates and at contact a1 closes operating circuits for release relay B and dialling relay C, the latter circuit being over winding (I) of relay C, contact e3, normal contact and wiper DS1, self-interrupting contacts dsm of the digit switch magnet, contact c1, digit switch magnet DSM and relay RA. Magnet DSM does not operate in this circuit due to the high resistance of the circuit. Relay B operating contact b1 disconnects battery from the incoming test wire and substitutes earth therefor, contact b2 closes the holding circuit of relay K over its winding (II) in series with winding (II) of relay WS but the latter relay does not operate in this circuit owing to the resistance in the circuit, contact b3 prepares the impulsing circuit, contact b4 removes a short circuit from the left hand winding of relay A and short circuits relay P, thereby bringing the left hand winding of relay A into a loop circuit, the signal earth having by this time been disconnected, contact b5 prepares a holding circuit for relay E and contact b6 operates relay JB and prepares the marking circuit. Relay JB disconnects winding (I) of the K relays of all the selectors served by the common control circuit. Relay C operating, contact c1 further prepares the impulsing circuit and connects winding (II) of relay C in this circuit and contact c2 disconnects wiper DS2.

It will first be assumed that relay P is unoperated due to its being short circuited by the signal earth on the negative wire at the preceding selector. Relay A responds to impulses and at each break closes a circuit over contacts a1, b3, c1, winding (II) of relay C, magnet DSM and winding (II) of relay RA. Magnet DSM operates and at the end of the impulse releases its armature thereby stepping the switch to the first or an odd contact. Over such a contact a circuit is closed for the magnet over wiper DS1 and contact f4 and the switch is stepped to the next contact, an even contact where it awaits receipt of the next impulse which causes it to step over two further contacts, and so on. At the end of the impulse train relay C releases connecting earth over contacts b1, f1, c2, e1, wiper DS2 to one of the digit relays W, X, Y or to relay Y in series with either relay W or X. The relevant relay or relays operate and hold temporarily over their contacts 1 and contacts f1 and b1 and at their contacts 3 close a circuit for relay E. The remaining contacts of the digit relays are arranged in tree formation and connect test relay T to one of the marking wipers DS4-8. Relay E operates and at contact e1 disconnects wiper DS2 and connects earth to wiper DS3. Contact e2 closes to hold the digit relay or relays after the subsequent operation of relay F. Contact e3 connects the normal contact to the sub-normal contact in the bank of wiper DS1 to provide an operating circuit for relay C thereover, contact e4 connects earth over contact f4 to the even contacts in the control bank thereby causing the digit switch to rotate to the subnormal position where it comes to rest, and contact e5 opens a point in the circuit of relay H. When the digit switch reaches its sub-normal position relay F operates over wiper DS3 and locks up over contacts f1 and b1. Contact f2 prepares a circuit for magnet SM over the commoned off-normal contacts in the bank of wiper DS3, contact f3 connects winding (I) of relay C over contact e3 to the sub-normal contact and contact f4 disconnects earth from the odd contacts in the control bank. The digit switch is stepped one contact per impulse for each impulse of the "units" train, relay C having previously re-operated and at the end of the train relay C releases and connects earth over wiper DS3 and contacts f2, t1, tt2, and k4 to magnet SM. During stepping of the digit switch contact ra2 connects lamp L in series with a slow alarm relay. The wanted line is marked over the tree contacts of the digit relays and one of the marking wipers and the selector is rotated until the marked contact is reached whereupon if the line is free relay T operates in a circuit from earth over contact b6, tree contacts, and marking wiper, marking wire, bank contacts and wiper arm 13 or 14, contacts k7, ws4, wiper arm 9 or 10 to battery over the cut-off relay of the called line. Contact t1 opens the sprag magnet circuit to stop the selector and closes a circuit for winding (I) of relay TT. Relay TT operates and locks up over the test circuit over its winding (II) and contact tt1. Contact tt2 opens a further point in the circuit of magnet SM and contact tt3, disconnects relay E and connects earth over contact b5 to operate relay H after the release of relay E. Contacts h2 and h3 switch the speaking wires through, contact h4 connects earth to the test wiper to mark the line engaged, contact h5 opens a point in the homing circuit of magnet SM and closes a point in the locking circuit of relay WS and contact h6 connects earth to wire d for a purpose previously described but since in the present example the bridge precedes the pre-final selector it is without effect. Contact h1 disconnects earth from the incoming test wire and connects battery thereto over the left hand winding of relay H thereby providing a circuit for relay H in the bridge circuit (Fig. 8) which operates, switches in the feeding bridge and applies ringing current to the line. The result of the reply of the called subscriber has already been described in connection with Fig. 8 and does not affect the final selector.

A further result of the operation of relay H is the release of relay A followed by that of relay B. A homing circuit is now closed for the digit switch over contacts a1, b3 and the contacts commoned directly and over contact f4, and wiper DS1 and the digit switch is restored to normal. The digit relays and relays F, K and JB release. Relays T and TT release due to their being short circuited over contact h4 and the marking circuit. The common control circuit is now restored to a normal condition and battery is again connected to the common connection to the incoming test wires of the final selectors which it serves, but this connection is held open at contact ra1 until the digit switch magnet has released after reaching normal.

If, when the selector reaches the marked line it is found busy relay T does not operate as the test bank contact will be earthed and the selector will continue to rotate until the last contacts in the dotted levels are reached. Relay LC is connected to these contacts in the levels associated with test wiper arms 10 and 12 and when the selector reaches such contacts relays T and LC operate and the switch is stopped. Contact lc1 holds relay E operated to prevent operation of relay H, contact lc2 disconnects direct earth from the positive wire and connects wire BT thereto to which a busy tone and battery are connected alternately at periodic intervals. During the connection of battery to wire BT, battery is also connected to wire BH to hold relay B over its second winding and contact lc3.

When the subscriber hears the busy tone he replaces his receiver and releases relay A. Relay B releases during the next tone period and the common control circuit and the selector are restored to normal. The restoration of the selector takes place in the manner described for the preceding selectors either by the release of relay H in the case of a successful call or by the release of relay K in the case of an unsuccessful call, the circuit of magnet SM being opened at contact on when the switch reaches its normal position. During the homing of the selector the common test-in circuit is opened at contact ra1, relay RA being operated by its winding (I) in series with magnet SM.

The above describes the method of selecting a particular line in one "hundred" group. Selection in the other "hundred" group proceeds in a similar manner but for this relay P is operated due to the absence of earth on the negative wire at the time the final selector is seized. Relay P operating, contact p1 closes a circuit over contact k8 for winding (I) of relay WS and the relay operates and being operated will hold by means of its winding (II) in series with winding (II) of relay K. The connections to the selector wipers are changed over from one set to the other the set connected to the front contacts of relay WS being those having access to levels in which the said other "hundreds" group of lines are connected. On the operation of relay H relay WS locks up over its winding (I) and contacts ws1 and h5. Contact ws5 connects a buzzer to the test jack for the purpose previously described.

What we claim as new and desire to secure by Letters Patent is:

1. A selective system for extending calls comprising serially related selecting switches including preliminary and final selectors, means for transmitting two signals to one of said preliminary selectors indicative of the destination of a call, said selector operated responsive to both signals to select a succeeding selector to transmit thereto a signal dependent on one of the received signals, said succeeding switch partly operated responsive to the signal transmitter thereto.

2. An automatic telephone system having three or more ranks of switches for extending connectors, each switch other than those of the final rank operated responsive to more than one digit of the same digit place, each said switch having discriminating means operated responsive to the reception of said digits to extend the connection to a corresponding outlet.

3. An automatic telephone system having several ranks of switches for extending connections, and in which impulses corresponding to a plurality of digits are transmitted to a switch in the first rank, said switch responsive to certain first digits to select a group and an idle trunk in said group, responsive to certain other first digits to select a group of trunks only after the receipt of a second digit, said switch operated by different first digits to select the same group of trunks, and by first and second digits of the second digit place to select other groups.

4. An automatic telephone system, having automatic switches with groups of trunk lines accessible thereto and means for transmitting a plurality of digits thereto, said switch operated in response to a first digit delivered thereto to a sub-normal position, and operated by impulses of a second digit to search for an idle trunk line in a particular group.

5. In an automatic telephone system, an automatic switch having groups of trunk lines accessible thereto, a digit switch therefor, said digit switch operated by the first digit of a called number in certain instances to operate the automatic switch to select a group of trunks and select an idle trunk therein, said digit switch operated in other instances by the first digit to move to a sub-normal position and thereafter operated by a second digit to cause the automatic switch to select a group and an idle trunk therein in accordance with the first and second digits.

6. In automatic telephone system, an automatic switch operated in response to either a first digit only or to a first and second digit to select a group of trunk lines, a relay operated in one instance to control the operation of the switch and another relay operated in the other instance to control the operation of the switch.

7. In an automatic telephone system, first, second and final selector switches, the first and second switches operated in response to more than one digit, a digit switch in the first and second selector switches operated in response to digits to transmit a discriminating signal to the succeeding switch to control selection therein.

8. In an automatic telephone system an automatic switch having a bank of contacts accessible thereto, trunk lines connected to said contacts connected in groups, means for sending discriminating signals to said switch, different starting positions for the switch for each group of trunk lines, and means in the switch responsive to said discriminating signal for causing the switch to start its selection of an idle trunk from a particular starting position depending on the signal received.

9. In a telephone system an automatic switch of the single motion type having a normal and a sub-normal starting position, an auxiliary switch responsive to impulses received to determine the starting position of the switch, different groups of trunk lines accessible to the switch from the different starting positions, said switch operated from the normal or sub-normal positions to select a trunk line in the group accessible from that starting position.

10. An automatic telephone system comprising final and intermediate selectors, a marking wire extending between said switches, a marking switch in the final selector, two main groups of lines accessible to the final selector having corresponding numbers, means in the intermediate switch for transmitting digits to the final selector and a marking signal over the marking wire to the marking switch thereof, said marking switch responsive to the discriminating signal to determine the main group in which the final selector will select a line.

11. In an automatic telephone system, an automatic switch for extending talking connections, another automatic switch accessible thereto, means for operating the first switch to seize the second switch, a clean metallic circuit extending through the first switch to the second switch, means for transmitting impulses over said circuit, and means responsive to a signal from the second switch for inserting a feeding bridge into the circuit.

12. In an automatic telephone system, an automatic switch for extending talking connections, means for operating said switch to extend talking connections locally or over trunk lines, a clean metallic circuit through said automatic switch, and means for substituting a battery feeding bridge for the metallic circuit only when calls are extended locally, and after the connection is completed.

13. In an automatic telephone system, a selector switch, a final selector switch accessible thereto, means for operating the selector and final selector to extend a connection to a called line, a continuous metallic test wire extending between the switches, a feeding bridge in the selector normally disconnected, means in the final selector operated after the connection is completed, for holding both switches over said test circuit, and a relay in the test circuit in the selector, operated thereafter over the test wire to connect the feeding bridge to the connection.

WILLIAM GEORGE PATTERSON.
DAVID ADAM CHRISTIAN.
WILLIAM HERBERT GRINSTED.